US009520075B2

(12) United States Patent
Cho et al.

(10) Patent No.: US 9,520,075 B2
(45) Date of Patent: Dec. 13, 2016

(54) IMAGE PROCESSING METHOD FOR DISPLAY APPARATUS AND IMAGE PROCESSING APPARATUS

(71) Applicant: LG Display Co., Ltd., Seoul (KR)

(72) Inventors: Byoungchul Cho, Seoul (KR); Namyong Gong, Paju-si (KR); Sangjae Park, Busan (KR)

(73) Assignee: LG Display Co., Ltd., Seoul (KR)

( * ) Notice: Subject to any disclaimer, the term of this patent is extended or adjusted under 35 U.S.C. 154(b) by 174 days.

(21) Appl. No.: 14/223,947

(22) Filed: Mar. 24, 2014

(65) Prior Publication Data

US 2014/0285477 A1 Sep. 25, 2014

(30) Foreign Application Priority Data

Mar. 25, 2013 (KR) ........................ 10-2013-0031343

(51) Int. Cl.

| | |
|---|---|
| ***G02F 1/1362*** | (2006.01) |
| ***G06F 3/042*** | (2006.01) |
| ***G09G 3/34*** | (2006.01) |
| ***G02F 1/13363*** | (2006.01) |
| ***G06K 9/00*** | (2006.01) |
| ***G09G 5/36*** | (2006.01) |
| ***G06K 9/22*** | (2006.01) |
| ***G06Q 20/04*** | (2012.01) |
| ***G09G 3/20*** | (2006.01) |

(Continued)

(52) U.S. Cl.

CPC .............. *G09G 3/2003* (2013.01); *G09G 5/02* (2013.01); *G09G 5/06* (2013.01); *G09G 5/10* (2013.01); *G09G 2320/0626* (2013.01); *G09G 2320/0666* (2013.01); *G09G 2340/06* (2013.01); *G09G 2360/144* (2013.01); *G09G 2360/145* (2013.01); *G09G 2360/16* (2013.01)

(58) Field of Classification Search

CPC ............................ G09G 3/3413; G02F 1/1336

See application file for complete search history.

(56) References Cited

U.S. PATENT DOCUMENTS 5,859,681 A * 1/1999 VanderPloeg ....... G02F 1/13363 349/118
6,567,543 B1 5/2003 Shiraiwa et al.
(Continued)

FOREIGN PATENT DOCUMENTS

JP 2007-081683 A 3/2007
KR 10-2001-0113257 A 12/2001
(Continued)

OTHER PUBLICATIONS

PCT International Search Report for PCT/KR2014/002528, Jul. 3, 2014, 3 Pages.
(Continued)

*Primary Examiner* — Lin Li
(74) *Attorney, Agent, or Firm* — Fenwick & West LLP

(57) ABSTRACT

An image processing method and apparatus using the image processing method are provided. The apparatus comprises a processor configured to scale color values of input image data, thereby simulating the optical characteristics of paper. The simulation takes into consideration varying ambient light conditions around the display to imitate the optical characteristics of physical paper in the same ambient light conditions.

16 Claims, 18 Drawing Sheets

(51) Int. Cl.

| | |
|---|---|
| ***G09G 5/02*** | (2006.01) |
| ***G09G 5/06*** | (2006.01) |
| ***G09G 5/10*** | (2006.01) |

(56) References Cited

U.S. PATENT DOCUMENTS

| | | | | |
|---|---|---|---|---|
| 9,093,050 | B1 * | 7/2015 | Orlov | G09G 5/36 |
| 2004/0189672 | A1 * | 9/2004 | Yamazaki | G06K 9/22 345/619 |
| 2004/0233125 | A1 * | 11/2004 | Tanghe et al. | 345/1.3 |
| 2006/0041506 | A1 * | 2/2006 | Mason | G06Q 10/10 705/42 |
| 2006/0161501 | A1 * | 7/2006 | Waserstein | G06Q 20/042 705/65 |
| 2007/0065022 | A1 * | 3/2007 | Miyamoto | 382/232 |
| 2008/0074524 | A1 * | 3/2008 | Panicacci | 348/308 |
| 2008/0122792 | A1 * | 5/2008 | Izadi | G06F 3/0421 345/173 |
| 2008/0252939 | A1 * | 10/2008 | Kato | G02F 1/1362 358/472 |
| 2012/0229490 | A1 * | 9/2012 | Rezaee | 345/589 |
| 2012/0287141 | A1 * | 11/2012 | Higgins et al. | 345/581 |
| 2013/0063486 | A1 | 3/2013 | Braun et al. | |
| 2013/0069998 | A1 | 3/2013 | Fergason | |
| 2013/0147778 | A1 * | 6/2013 | Ninan | G09G 3/3426 345/207 |
| 2014/0037183 | A1 * | 2/2014 | Gorski | G06K 9/00449 382/138 |
| 2014/0232764 | A1 * | 8/2014 | Nishio | 345/690 |

FOREIGN PATENT DOCUMENTS

| | | |
|---|---|---|
| KR | 10-2012-0052019 A | 5/2012 |
| WO | WO 2011/039813 A1 | 4/2011 |

OTHER PUBLICATIONS

European Search Report for European Patent Application No. EP 14775640.7, Oct. 10, 2016, 10 Pages.

* cited by examiner

Luminance = f(characteristic of paper, illumination, color temperature) nit · · · Equation 1

Color temperature = g(characteristic of paper, illumination, color temperature) : 1 · · · Equation 2

C/R = h(characteristic of paper, characteristic of ink, illumination, color temperature) k · · · Equation 3

FIG. 1E

| COLOR TEMPERATURE OF EXTERNAL LIGHT \ ILLUMINATION OF EXTERNAL LIGHT | 0~500 lux | | | 501~2000 ux | | | . . . |
|---|---|---|---|---|---|---|---|
| | LUMINANCE | C/R | COLOR TEMPERATURE | LUMINANCE | C/R | COLOR TEMPERATURE | . . . |
| 0 ~ 4000k | 50 nit | 22:1 | 3800k | 105 nit | 27:1 | 4000k | . . . |
| 4001k ~ 5000k | 55 nit | 25:1 | 4000k | 110 nit | 30:1 | 4500k | . . . |
| . . . . | . . . . | . . . . | . . . . | . . . . | . . . . | . . . . | |

FIG. 1H

| IMAGE CHARACTERISTIC / INPUT GRADATION | 110nit 22:1 3800k | 115nit 25:1 4000k | ...... |
|---|---|---|---|
| 0 | 3 | 8 | ...... |
| 1 | 4 | 8 | ...... |
| 2 | 5 | 9 | ...... |
| 3 | 7 | 11 | ...... |
| ⋮ | ⋮ | ⋮ | ⋮ |
| 255 | 240 | 248 | ...... |

FIG. 1I $G_{max} = j$ (LUMINANCE, C/R, COLOR TEMPERATURE) · · · Equation 4

$G_{min} = i$ (LUMINANCE, C/R, COLOR TEMPERATURE) · · · Equation 5

$$G_{out} = G_{min} + \frac{G_{max} - G_{min}}{2^n - 1} \times G_{min}$$ · · · Equation 6

(a)

(b)

(c)

IMAGE PROCESSING METHOD FOR DISPLAY APPARATUS AND IMAGE PROCESSING APPARATUS

CROSS-REFERENCE TO RELATED APPLICATION

This application claims priority to and the benefit of Korean Patent Application No. 10-2013-0031343, filed on Mar. 25, 2013, the disclosure of which is incorporated herein by reference in its entirety.

BACKGROUND

1. Field of the Invention

The present disclosure relates to an image processing method and apparatus for display devices, and more particularly, to an image processing method and apparatus for display devices, which variably control various image quality modes including a paper mode.

2. Discussion of Related Art

Recently, as interest in information display increases and the demand for portable electronic devices increases, light and thin flat panel display devices are being widely researched and commercialized. Among such flat panel display devices, in particular, liquid crystal display (LCD) devices and organic light emitting display (OLED) devices are being widely researched.

Both display devices can display image contents using various image quality modes, each having a varying degree of optical characteristics such as luminance, contrast ratio (C/R), color temperature and color gamut.

SUMMARY OF THE INVENTION

Unlike a display device, paper is not self-emissive but only reflects ambient light. Accordingly, the inventors of the embodiments in the present disclosure recognized that the optical characteristics perceived by a person would be different for an image content printed on a sheet of paper from that of the image content displayed on a display device under changing ambient light conditions.

For example, when a user reads a book, the user eyes perceive the ambient light reflected off the book. The pupils of human eyes adjust its sensitivity depending on the ambient light. For instance, the brightness and colors of the printed matters change under different ambient lighting conditions such as weather conditions, time (day or night), or other ambient lighting conditions. Consequently, a printed matter adaptively changes its image qualities to be seen very naturally to a user. The self-emitting display devices, however, are optically less affected by ambient environment than the printed matters.

The inventors of the present disclosure recognized that most users prefer a natural image quality such as a paper-like feeling in comparison with the common display devices such as LCD devices and OLED devices.

Accordingly, an aspect of the present disclosure relates to an image processing method for display device to imitate the optical characteristics of substantial paper under ambient environment. To provide such a natural image quality of the prints on the display device under certain ambient light condition, the ambient light characteristics and the optical characteristics of substantial paper can be used to imitate the characteristics of the image content printed on the paper.

In one embodiment, a method for simulating paper-like images on a display measures one or more ambient light characteristics from one or more sensors, determines maximum brightness values for red, green and blue (RGB) sub-pixels of a display pixel based on a light reflectance rate of a paper type and the ambient light characteristics, determines minimum brightness values for the RGB sub-pixels of the display pixel based on a light reflectance rate of an ink type and the ambient light characteristics, scales red, green and blue (RGB) color values of image data associated with the sub-pixels of each of the display pixels in reference to the maximum brightness values and the minimum brightness values and activates each of the display pixels using the scaled RGB color values of the image data.

In one embodiment, the maximum brightness values and the minimum brightness values for the RGB sub-pixels are generated by converting the one or more ambient light characteristics into a normalized set of RGB color values of ambient light, applying the light reflectance rate of the paper type to each of the normalized RGB color values of the ambient light and applying the light reflectance rate of the ink type to each of the normalized RGB color values of the ambient light.

In one embodiment, ambient light characteristics includes an illuminance of the ambient light, and wherein the scaled RGB color values of the image data are compensated with a preset value for the display to maintain a minimal luminance when the illuminance of the ambient light is below a threshold value.

In one embodiment, receiving application information indicative of a type of display content and activating each of the display pixels using the scaled RGB color values of the image data when the type of display content is a text oriented content.

In one embodiment, the application information includes information indicative of a size and a location of the display content when the type of display content is the text oriented content, and wherein each of the display pixels in a part of the display corresponding to the text oriented content is activated with the scaled RGB color values.

In one embodiment, scaling the color values of the image data is performed based on the following equation (7), equation (8) and equation (9):

$$R_{output} = R_{min} + \frac{R_{max} - R_{min}}{2^n - 1} \times R_{input} \quad \text{Eqn (7)}$$

$$G_{output} = G_{min} + \frac{G_{max} - G_{min}}{2^n - 1} \times G_{input} \quad \text{Eqn (8)}$$

$$B_{output} = B_{min} + \frac{B_{max} - B_{min}}{2^n - 1} \times B_{input} \quad \text{Eqn (9)}$$

where the $R_{max}$, the $G_{max}$ and the $B_{max}$ are the maximum brightness values for the RGB sub-pixels of the display pixel, the $R_{min}$, the $G_{min}$ and the $B_{min}$ are the minimum brightness values for RGB sub-pixels of the display pixel, the $R_{input}$, the $G_{input}$ and the $B_{input}$ are the RGB color values of image data associated with the corresponding sub-pixels of each of the display pixels, and the $R_{output}$, the $G_{output}$ and the $B_{output}$ are the scaled RGB color values.

In one embodiment, the ambient light characteristics includes intensity of RGB in the ambient light, and wherein scaling the color values of the image data is performed based on a look up table (LUT) including a range of scaled RGB values corresponding to a range of the intensity of RGB in the ambient light.

In one embodiment, the intensity of RGB is calculated based on an illumination value and a color temperature value of the ambient light measured by said one or more sensors.

In one embodiment, adjusting the red, the green and the blue color values of image data associated with the sub-pixels of each of the display pixels based on texture of the paper type.

In one embodiment, the one or more ambient light characteristics includes an illumination value and a color temperature of the ambient light, and wherein the illumination value and the color temperature value are estimated based on the current time and the current weather condition at the current position of the display.

Another aspect of the present disclosure relates to a display device capable of imitating prints on a paper under the ambient lighting condition.

In one embodiment, a display includes a plurality of display pixels, each of the pixels having red, green and blue (RGB) sub-pixels, one or more sensors for measuring one or more ambient light characteristics and a processor configured to determine maximum brightness values for the RGB sub-pixels of the display pixel based on a light reflectance rate of a paper type and the measured ambient light characteristics, determine minimum brightness values for the RGB sub-pixels of the display pixel based on a light reflectance rate of an ink type and the ambient light characteristics, scale red, green and blue (RGB) color values of image data associated with the respective RGB sub-pixels of each of the display pixels in reference to the maximum brightness values and the minimum brightness values and activate each of the display pixels using the scaled RGB color values of the image data.

In one embodiment, the processor is configured to convert the one or more ambient light characteristics into a normalized set of RGB color values, and to apply the light reflectance rate of the paper type to each of the normalized RGB color values of the ambient light to calculate the maximum brightness values, and to apply the light reflectance rate of the ink type to each of the normalized RGB color values of the ambient light to calculate the minimum brightness values for the RGB sub-pixels.

In one embodiment, the processor is configured to receive application information indicative of a type of display content, and to activate each of the display pixels using the scaled RGB color values of the image data when the type of display content is a text oriented content.

In one embodiment, the processor is configured to identify a size and a location of the display content when the type of display content is the text oriented content, and to activate each of the display pixels in a part of the display corresponding to the text oriented content with the scaled RGB color values.

In one embodiment, the processor is configured to scale the color values of the image data according to the following equation (7), equation (8) and equation (9):

$$R_{output} = R_{min} + \frac{R_{max} - R_{min}}{2^n - 1} \times R_{input} \quad \text{Eqn (7)}$$

$$G_{output} = G_{min} + \frac{G_{max} - G_{min}}{2^n - 1} \times G_{input} \quad \text{Eqn (8)}$$

$$B_{output} = B_{min} + \frac{B_{max} - B_{min}}{2^n - 1} \times B_{input} \quad \text{Eqn (9)}$$

where the $R_{max}$, the $G_{max}$ and the $B_{max}$ are the maximum brightness values for the RGB sub-pixels of the display pixel, the $R_{min}$, the $G_{min}$ and the $B_{min}$ are the minimum brightness values for RGB sub-pixels of the display pixel, the $R_{input}$, the $G_{input}$ and the $B_{input}$ are the RGB color values of image data associated with the corresponding sub-pixels of each of the display pixels, and the $R_{output}$, the $G_{output}$ and the $B_{output}$ are the scaled RGB color values.

In one embodiment, one or more sensors are configured to measure intensity of RGB in the ambient light, and wherein the processors is configured to scale the color values of the image data using a look up table (LUT) containing a range of scaled RGB values corresponding to a range of the intensity of RGB in the ambient light.

In one embodiment, the processor is configured to convert the measured intensity of RGB in the ambient light by said one or more sensors to be applicable to the LUT.

In one embodiment, the processor is configured to further adjust the scaled RGB color values based on a texture of the paper type.

In one embodiment, the processor is configured to estimate an illumination value and a color temperature value based on the current time and the current weather condition at the current position of the display, and to determine maximum and minimum brightness values for the RGB sub-pixels based on the estimated illumination value and the estimated color temperature value of the ambient light.

Yet another aspect of the present disclosure relates to a semiconductor chip for imitating prints on a paper under the ambient lighting condition. In one embodiment, a semiconductor chip is configured to adaptively adjust image data based on red, green and blue (RGB) color values that are scaled in reference to maximum brightness values and minimum brightness values for red, green and blue (RGB) sub-pixels, wherein the maximum brightness values and the minimum brightness values based on one or more ambient light characteristics with respect to a light reflectance rate of a paper type and an ink type, respectively. Wherein the RGB color values of the image data is scaled according to the following equation (7), equation (8) and equation (9):

$$R_{output} = R_{min} + \frac{R_{max} - R_{min}}{2^n - 1} \times R_{input} \quad \text{Eqn (7)}$$

$$G_{output} = G_{min} + \frac{G_{max} - G_{min}}{2^n - 1} \times G_{input} \quad \text{Eqn (8)}$$

$$B_{output} = B_{min} + \frac{B_{max} - B_{min}}{2^n - 1} \times B_{input} \quad \text{Eqn (9)}$$

where the $R_{max}$, the $G_{max}$ and the $B_{max}$ denote the maximum brightness values for the RGB sub-pixels of the display pixel, wherein the $R_{min}$, the $G_{min}$ and the $B_{min}$ denote the minimum brightness values for RGB sub-pixels of the display pixel, wherein the $R_{input}$, the $G_{input}$ and the $B_{input}$ denote the RGB color values of image data associated with the corresponding sub-pixels of each of the display pixels, and wherein the $R_{output}$, the $G_{output}$ and the $B_{output}$ denote the scaled RGB color values.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 1E is a look up table (LUT) for describing an aspect in which the image characteristics determining unit of the display device according to one exemplary embodiment of the present disclosure determines image characteristics;

FIG. 1H is a look up table (LUT) for describing an aspect in which the image processor of the display device according to one exemplary embodiment of the present disclosure converts an input image to implement a determined image characteristics;

FIG. 1I illustrates equations for describing an aspect in which the image processor of the display device according to one exemplary embodiment of the present disclosure converts an input image to implement a determined image characteristics;

DETAILED DESCRIPTION OF EXEMPLARY EMBODIMENTS

Exemplary embodiments of the present disclosure will be described in detail below with reference to the accompanying drawings. While the present disclosure is shown and described in connection with exemplary embodiments thereof, it will be apparent to those skilled in the art that various modifications can be made without departing from the scope of the invention.

In this specification, like numbers refer to like elements throughout the description of the drawings.

In this specification, although the terms first, second, etc. may be used to describe various elements, it should be understood that these elements are not limited by these terms. These terms are only used to distinguish one element from another. For example, a first element could be termed as a second element, and, similarly, a second element could be termed as a first element, without departing from the scope of exemplary embodiments.

In this specification, color information may be expressed as various color spaces such as YUV, CMYK, HSV, and RGB. In this specification, embodiments are described using the RGB color space. However, it should be appreciated that the embodiments of the present disclosure can be implemented with other types of the color space such as YUV, CMYK, HSV, HSV and the like.

In this specification, a combination of blocks in an accompanying block diagram and a combination of operations in a flowchart may be performed by computer executable instructions, which may be implemented with hardware or firmware and/or software stored in a non-transitory storage medium.

In this specification, it should be noted that the order in which the functions of the blocks and/or the operations is not particularly limited. For example, two blocks or operations shown in sequence may be executed substantially at the same time, or be often executed in a reverse sequence according to the corresponding functions.

Figure 1A:
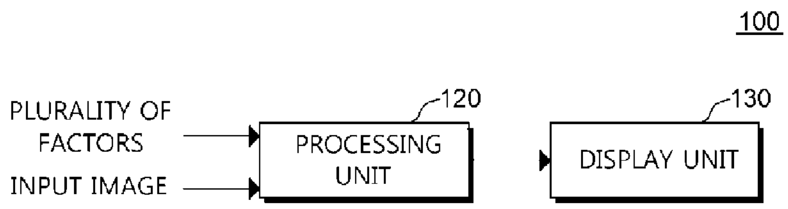
FIG. 1A is a block diagram illustrating a display device according to one exemplary embodiment of the present disclosure.

FIG. 1A is a block diagram illustrating a display device according to one exemplary embodiment of the present disclosure. A display device 100 according to one exemplary embodiment of the present disclosure includes a processing unit 120 and a display unit 130.

Depending on an image quality mode of the display, the processing unit 120 scales the input image based on the plurality of factors and transfers the scaled input image to the display unit 130. The term "a plurality of factors" referred as the values for scaling an input image and the term "image quality mode" may also be referred to "display mode" or "screen mode".

The display device 100 can provide a plurality of image quality modes, which may be selected by a user input or may be automatically selected by the processing unit based on the plurality of factors. Each of the image quality modes has different image characteristics defined by color temperature, luminance, contrast ratio (C/R) and color gamut. The image quality mode of the display device 100 according to one exemplary embodiment of the present disclosure may be an image quality mode having image characteristics for imitating the optical characteristics of the image content printed on paper. The optical characteristics of paper include reflectance of paper. The optical characteristics of an ink include reflectance of an ink. The optical characteristics of paper may further include transmittance, opacity, whiteness and texture of paper.

The term "optical characteristics of printed matter" include both of the optical characteristics of paper and the optical characteristics of an ink.

Figure 1B:
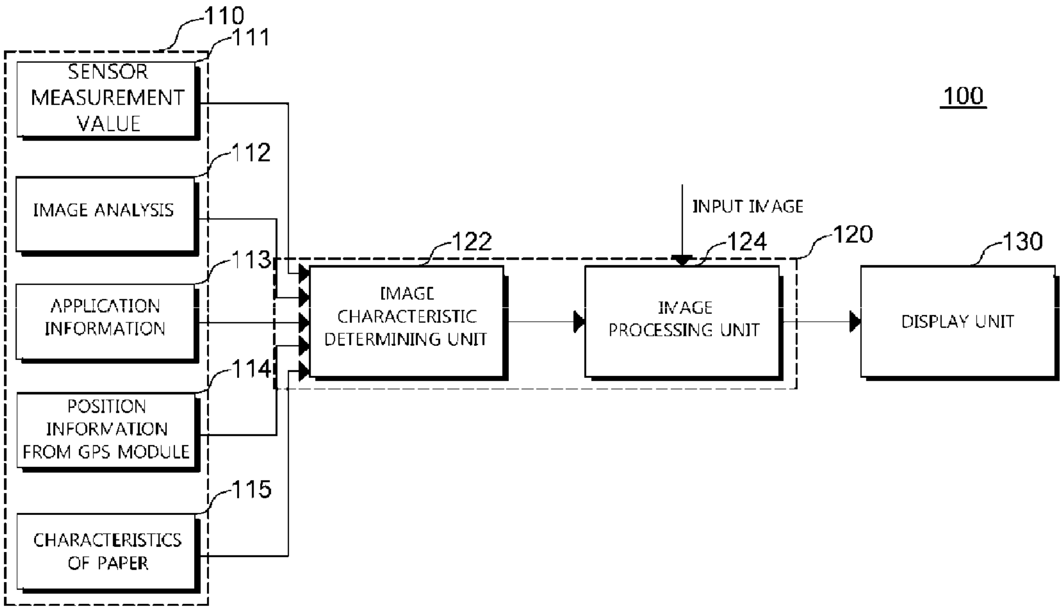
FIG. 1B is a block diagram illustrating the display device according to one exemplary embodiment of the present disclosure.

FIG. 1B is a block diagram illustrating the display device according to one exemplary embodiment of the present disclosure.

The display device 100 includes a processing unit 120 including image characteristics determining unit 122 and an image processor 124, and a display unit 130. In simulating the image content printed on a paper, the display device 100 is configured to consider one or more of a plurality of factors 110. The plurality of factors 110 may include sensor measured values 111, image analysis 112, application information 113, position information 114 from a Global Positioning System (GPS) module, characteristics of paper 115. The processing unit does not necessarily need to consider all of the plurality of factors described in the present disclosure.

The display device 100 may be exposed to various ambient light conditions and the sensor measured values 111 may be measured by one or more light sensors. The light sensor may be referred to as a "light module", a "photodiode", a "phototransistor", an "image sensor" which is capable of measuring information of a visible light wavelength. The light sensor detects characteristics of ambient light and converts the light into a digital value. Depending on the type of light sensor, various kinds of ambient light characteristics can be measured, for example an illuminance value, a color value, a color temperature value and/or a distance value can be measured. Some of the light sensor may be disposed in a display area while some of the light sensors may be disposed in a non-display area of the display device.

The plurality of factors may include image analysis 112 for adjusting the image characteristics by analyzing a displayed image. The processing unit 120 may receive information from an operating system (OS). The processing unit 120 additionally adjusts the image characteristics of the image quality mode selected by a user based on the image analysis 112. Predetermined image quality modes for different applications may be stored and the predetermined mode may be read whenever a corresponding application is executed. Also, the processing unit 120 may further analyze information on contents displayed in a corresponding application to determine the degree of adjustment.

For example, the display device 100 according to one exemplary embodiment of the present disclosure may collect information (such as whether a currently executed application includes video reproduction information and is an e-book content application or an application including an electronic document) on displayed contents from the OS.

The processing unit 120 may acquire the application information 113 including coordinates of an application window.

The processing unit 120 may acquire the position information 114 from the GPS module. The processing unit 120 may collect additional position information such as a position information based on an access point (AP) or a Wi-Fi sharer to determine whether the display device 100 is disposed indoors or outdoors. Also, position information based on a moving pattern analysis of the display device 100 may be used. Also weather information of the current time may be used. In the display device 100 according to one exemplary embodiment of the present disclosure, the position information may be used to estimate an ambient environment of the corresponding position.

The image characteristics determining unit 122 may simulate the desired image characteristics of a displayed image or may determine image characteristics thereof so as to optimize a mode selected by a user based on the plurality of factors 110.

The image processor 124 scales an input image to implement the image characteristics of the displayed image determined by the image characteristics determining unit 122. The scaling process may use a look up table (LUT) or an equation. A detailed configuration and operation method of the image processor 124 will be described below with reference to FIGS. 1G to 1I.

Figures 1C, 1D:
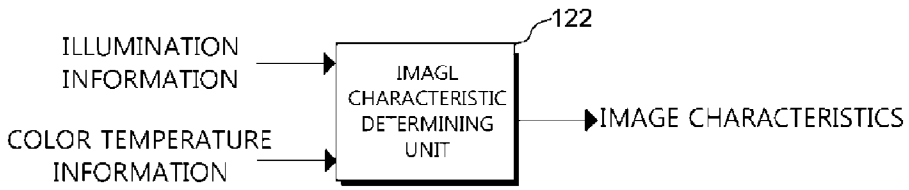
FIG. 1C is a block diagram illustrating an exemplary aspect of image characteristics determining unit of the display device according to one exemplary embodiment of the present disclosure.
FIG. 1D illustrates equations for describing an aspect in which the image characteristics determining unit of the display device according to one exemplary embodiment of the present disclosure determines image characteristics.

The display unit 130, as described above, may be the LCD device or the OLED device, and may receive an image-processed image to display an image. Image characteristics of the image displayed by the display unit 130 can be measured by displaying a test pattern on the display unit 130 and measuring with a luminance measuring device, an illumination measuring device, color temperature measuring device or the like FIG. 1C is a block diagram illustrating an exemplary aspect of image characteristics determining unit of the display device according to one exemplary embodiment of the present disclosure. The image characteristics determining unit 122 may determine image characteristics of an image quality mode based on the plurality of factors 110 which include a measurement value 111 from the sensor, a result of image analysis 112, application information 113, position information 114 from a GPS module, and characteristics of paper 115.

In the following description, for convenience of description, the plurality of factors 110 are assumed to include illumination information from an illumination sensor and color temperature information from a color temperature sensor, but the selected plurality of factors 110 are merely exemplary. The present disclosure is not limited thereto, but image characteristics of an image quality mode may be determined based on a combination of various factors such as the measurement value 111 from the above-described sensor, the image analysis 112, the application information 113, the position information 114 from the GPS module, and the characteristics of paper 115.

The image characteristics determining unit 122 of the display device 100 according to one exemplary embodiment of the present disclosure, for example, may receive an illumination value of the ambient light from the illumination sensor and a color temperature value of the ambient light from the color temperature sensor.

In the following description, for convenience of description, an image quality mode is assumed to be a paper mode.

The paper mode may be an image quality mode having image characteristics for imitating the optical characteristics of the image contents printed on paper. The optical characteristics of paper include at least reflectance of paper. The optical characteristics of an ink include at least reflectance of an ink. The paper mode which actively changes the optical characteristics of the image depending on the ambient light conditions.

To imitate the optical characteristics of paper, the image characteristics determining unit 122 of the display device 100 according to one exemplary embodiment of the present disclosure may determine characteristics of an image so as to have characteristics similar to actual paper, according to various known test methods. In the test methods, there are Korean Industrial Standards "KS M 7038, testing method for opacity of paper," "KS M ISO 11475, paper and board-determination of CIE whiteness, D65/10 degrees (outdoor daylight))," "KS M ISO 11476, paper and board-determination of CIE whiteness, C/2 degrees (indoor illumination conditions)),” and International Organization for Standardization (ISO) corresponding to the above-described measurement method.

Referring to FIG. 1C, the image characteristics determining unit 122 of the display device 100 according to one exemplary embodiment of the present disclosure may determine image characteristics of an image in the paper mode based on ambient illumination information and color temperature information on the display device 100. The determined image characteristics may be transferred to the image processor 124.

In a method in which the image characteristics determining unit 122 determines image characteristics of the image quality mode based on the plurality of factors 110, there may be a method using a look up table (LUT) or a method using an equation. Hereinafter, the method using the look up table (LUT) and the method using the equation will be described.

Moreover, in the display device 100 according to one exemplary embodiment of the present disclosure, various ambient light conditions and various kinds of paper may be considered for simulating the optical characteristics of the printed matter. For example, a fluorescent lamp having a color temperature of 6,500 K and a light emitting diode (LED) having a color temperature of 5,000 K may be considered as light sources. Also, copying paper for a general office may be considered as paper. Also, in addition to the copying paper, ivory vellum paper, newsprint and the like have various optical characteristics. Optical characteristics of various paper may be extracted through the above-described various test methods, and the image characteristics determining unit 122 may reflect the extracted characteristics of paper and the extracted characteristics of a light source in an image.

The image characteristics of the display device 100 according to one exemplary embodiment of the present disclosure include a correlated color temperature, a contrast ratio (C/R), luminance, etc. The image characteristics can be measured when the display device 100 applies the maximum input gradation value. Specifically, the image characteristics denote a color temperature and maximum luminance of the display device 100 which are measured when gradation values of an input image are the R maximum value (Rmax), the G maximum value (Gmax), and the B maximum value (Bmax) Also, the image characteristics denote a C/R of the display device 100 which is measured when gradation values of an input image are the R minimum value (Rmin), the G minimum value (Gmin), and the B minimum value (Bmin) to measure the minimum luminance-to-maximum luminance ratio of the display device 100. The measured maximum luminance, minimum luminance, a C/R, and color temperature of the display device 100 denote default image characteristics of the display device 100.

FIG. 1D illustrates equations for describing an aspect in which the image characteristics determining unit of the display device according to one exemplary embodiment of the present disclosure determines image characteristics.

When the plurality of factors 110 are factors capable of being expressed numerically, equations for each image characteristics may be defined with each of the factors 110 as a variable or a constant, and for example, stored in a memory.

Referring to FIG. 1D, for example, Equations 1 to 3 are illustrated with characteristics of paper, a correlated color temperature of ambient light obtainable from the color temperature sensor, and an illumination of the ambient light obtainable from the illumination sensor as variables.

Equation 1 of FIG. 1D is an equation for determining the maximum luminance of an image with characteristics of paper and illumination as variables, and Equation 2 of FIG. 1D is an equation for determining a color temperature of the image with the characteristics of paper and a correlated color temperature as variables.

The image characteristics determining unit 122 of the display device 100 according to one exemplary embodiment of the present disclosure may apply characteristics of paper to Equation 1 as variables or constants, and thus determine image characteristics in the paper mode so as to imitate various types of paper.

The image characteristics determining unit 122 of the display device 100 according to one exemplary embodiment of the present disclosure may apply an illumination (lux) value measured from the sensor, a correlated color temperature value, position information measured from the GPS module, a time of the GPS position information, weather information based on the position information, and an illumination value and correlated color temperature value corresponding thereto to Equations 1 and 2 as variables or constants, and thus determine image characteristics in the paper mode so as to correspond to various changeable ambient environment.

The image characteristics determining unit 122 of the display device 100 according to one exemplary embodiment of the present disclosure, as described above, may select one or more illumination values from among a plurality of ambient environmental factors, for example, an illumination value measured from the illumination sensor, an average illumination value measured from a color sensor, a current time based on position information from the GPS module, and illumination values at the position.

The image characteristics determining unit 122 may add weight to an average illumination value of the plurality of above-described illumination values or each of the illumination values, select a calculated illumination value, determine an illumination value suitable for an ambient environment, and apply the determined illumination value to Equations 1 to 3 as a constant or a variable.

The image characteristics determining unit 122 of the display device 100 according to one exemplary embodiment of the present disclosure, as described above, may select one or more correlated color temperature values from among a plurality of color temperature environmental factors, for example, a correlated color temperature value measured from the color temperature sensor, a correlated color temperature value calculated from the color sensor, a current time based on position information from the GPS module, a correlated color temperature value at the position, and a correlated color temperature value determined from a selected light source.

The image characteristics determining unit 122 may add weight to an average correlated color temperature value of the plurality or each of the correlated color temperature values, select a calculated correlated color temperature value, determine a correlated color temperature value suitable for an ambient environment, and apply the determined correlated color temperature value to Equations 1 to 3 as a constant or a variable.

The image characteristics determining unit 122 may select an illumination value and color temperature value of the ambient light measured by one or more sensors so as to determine the intensity of RGB in the ambient light. The RGB intensity can be obtained from a RGB sensor but even without a RGB sensor, the image characteristics determining unit 122 can calculate the RGB intensity with the illumination value and color temperature value of the ambient light through CCT to RGB conversion. The intensity of RGB can be reproduced into a look up table such that a range of scaled RGB values can correspond to a range of the intensity of RGB in the ambient light.

The image characteristics determining unit 122 of the display device 100 according to one exemplary embodiment of the present disclosure may determine whether the display device 100 is disposed indoors or outdoors based on position information received from the GPS module or a communication module, set a target illumination according to the determined result, set a target illumination of sunlight corresponding to a time based on time information, and set a target illumination of the sunlight using weather information based on the position information.

The image characteristics determining unit 122 of the display device 100 according to one exemplary embodiment of the present disclosure may determine whether the display device 100 is disposed indoors or outdoors based on position information received from the GPS module or the communication module, set a target color temperature according to the determined result, set a target color temperature of sunlight corresponding to a time based on time information, and set a target color temperature of the sunlight using weather information based on the position information.

The image characteristics determining unit 122 of the display device 100 according to one exemplary embodiment of the present disclosure may set an illumination and color temperature environment included in the plurality of factors 110 as a light source, and determine an optical characteristic, which is shown when light from the light source is reflected from target paper, as image characteristics in the paper mode.

For example, the image characteristics determining unit 122 may select reflectance of paper as characteristics of the paper, and combine a measured illumination and color temperature of ambient light with the characteristics of paper to determine image characteristics in the paper mode.

Figure 8:
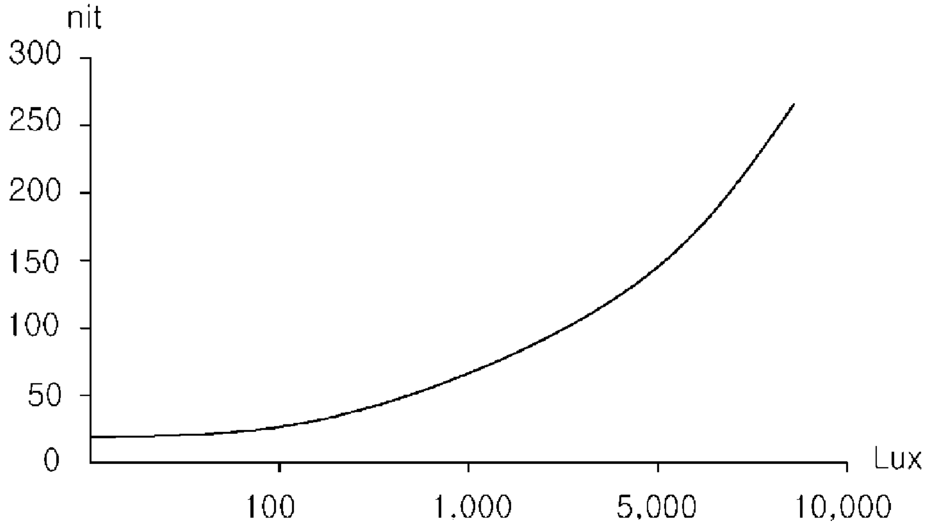
FIG. 8 illustrates target luminance based on illumination of ambient light in the paper mode when reflectance of paper is 80% as an example.

FIG. 8 shows target luminance based on illumination of ambient light in the paper mode when reflectance of paper is 80% as an example. The target luminance denotes luminance indicated by the maximum gradation value of an input image. In other words, the FIG. 8 is a look up table (LUT) that outputs the stored maximum gradation value according to the measured illumination value. In addition, when the light sensor is a color sensor which can detect the illumination light of red, green and blue independently, the look up tables for each of colors output the stored maximum gradation values for maximum gradation value of red, maximum gradation value of green and maximum gradation value of blue according to the measured illumination values of red, green and blue light.

Luminance corresponding to the other gradation values of the input image may be determined in proportion to the maximum gradation value. Referring to FIG. 8, an x-coordinate indicates the illumination (lux) of the ambient light, and a y-coordinate indicates an emission luminance (nit) of the display device 100. Luminance in the paper mode is shown with reflectance of paper being applied depending on the illumination of the ambient light. The target luminance in the paper mode may have the minimum emission luminance as an offset for a user's visibility since when the ambient light is too dark, a user cannot see the real paper and the paper mode is the same. Therefore, when the paper mode is implemented, it is needed to maintain the minimum brightness of the display device by setting a threshold value of the illumination. In FIG. 8, when the illumination of the ambient light is 0 lux, the minimum emission luminance of 18 nits is shown as an example. The image characteristics determining unit 122 may determine luminance in the paper mode based on the reflectance of the paper and the illumination of the ambient light.

The image characteristics determining unit 122 may determine a color temperature in the paper mode based on reflectance of paper and illumination of ambient light. For example, it is assumed that paper having a color temperature of 3,000 K to 5,000 K is used.

Figure 9:
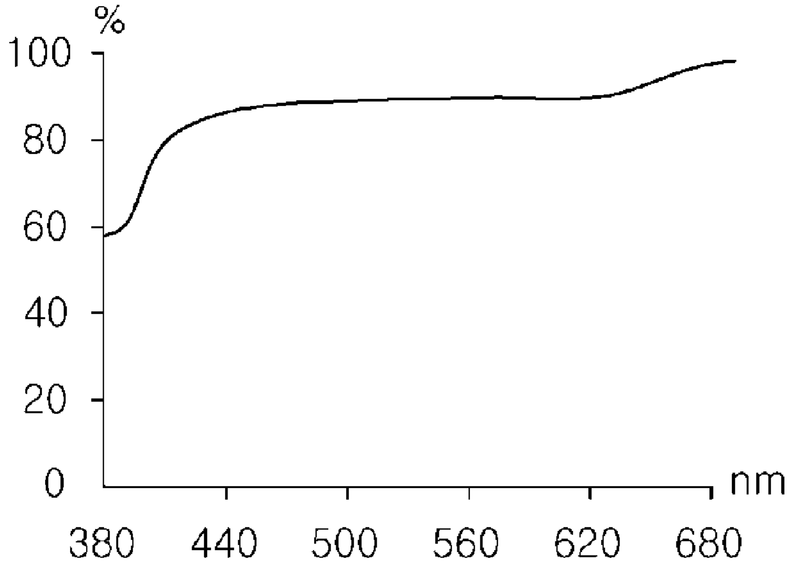
FIG. 9 illustrates reflectance by wavelength of paper.

FIG. 9 illustrates reflectance by wavelength of paper. Referring to FIG. 9, an x-coordinate indicates a wavelength (nm) of visible light, and a y-coordinate indicates reflectance (%). Reflectance by wavelength of the paper is rapidly reduced at or below 440 nm, and thus the paper is characterized by having a color temperature lower than that of LCD devices or OLED devices because wavelength reflectance of a blue area decreases.

The image characteristics determining unit 122 may apply reflectance by wavelength of paper to a color temperature or energy by wavelength of ambient light to determine a target color temperature in the paper mode. The image characteristics determining unit 122 may measure or calculate the color temperature of the ambient light in various methods.

The image characteristics determining unit 122 of the display device 100 according to one exemplary embodiment of the present disclosure may convert a color sensor values into the color temperature value. For example, red (R), green (G), and blue (B) values from the color sensor is converted into XYZ-CIE tristimulus values. Then the image characteristics determining unit 122 converts the converted XYZ-CIE tristimulus values into CIE 1931 xy chromaticity coordinates or CIE 1976 u'v' chromaticity coordinates. The conversion can be done vice versa to calculate red (R), green (G) and blue (B) values from the color temperature value measured by a color temperature sensor.

To determine the maximum brightness values of the paper mode for red (R), green (G) and blue (B) sub-pixels of a display pixel based on a light reflectance rate of a paper type and the ambient light characteristics, the reflectance of visible wavelength of the paper and the ambient light intensity distribution of visible wavelength can be used. By multiplying the reflectance of visible wavelength and ambient light intensity distribution of visible wavelength, the image characteristic determining unit 122 can simulate the reflected ambient light.

The reflected ambient light contains its visible wavelength intensity distribution. The visible wavelength intensity distribution is assumed as the image which a user perceives. In real practices, three primary light red (R), green (G) and blue (B) intensity information can be useful. Consequently, the image characteristic determining unit 122 can extract the intensity of red (R), green (G) and blue (B) lights.

This result indicates that when the paper which is the target paper of the paper mode reflects the ambient light, differences of the light intensity of red (R), green (G) and blue (B) may occur. The red (R), green (G) and blue (B) values can be converted into a normalized set of RGB color values of ambient light for convenience. The normalization may be required to adjust the digital image data and the display panel characteristics. For example, when the digital image data is (255, 255, 255) input to a LCD display device, the luminance is 300 nits, the C/R is 1:1000 and color temperature is 6000K. On the other hand, when the same image data input to a OLED display, the luminance is 400 nits, the C/R is 1:15000 and color temperature is 7000K.

Therefore, it is required to compensate the differences of the display devices. RGB color values can be normalized to have the same optical characteristics of the paper mode when the same data is input to the different devices. The normalized values can be determined depending on the optical characteristics of the display device.

In theory, the RGB color values of the ambient light represent the optical characteristics of the ambient light reflected off the paper. In summary, RGB color values can be used as the maximum brightness of the paper mode.

Hereinafter, various conversion equations for the image characteristics determining unit 122 analyzing a color temperature are shown.

$$RGB \text{ to } XYZ \text{ } Tristumulus$$

$$\begin{bmatrix} X \\ Y \\ Z \end{bmatrix} = \frac{1}{0.17697}\begin{bmatrix} 0.49 & 0.31 & 0.20 \\ 0.17697 & 0.81240 & 0.01063 \\ 0.00 & 0.01 & 0.99 \end{bmatrix}\begin{bmatrix} R \\ G \\ B \end{bmatrix}$$

$$XYZ \text{ to } CIE1976u'v' \text{ chromaticity coordinates}$$

$$u' = \frac{4X}{X + 15Y + 3Z}$$

$$v' = \frac{9Y}{X + 15Y + 3Z}$$

$$XYZ \text{ to } CIE1931xy \text{ chromaticity coordinates}$$

$$x = \frac{X}{X + Y + Z}$$

$$y = \frac{Y}{X + Y + Z}$$

$$XYZ \text{ to } Yxy \text{ conversion}$$

$$X = \frac{x}{y}Y$$

$$Z = \frac{z}{y}Y = \frac{1 - x - y}{y}Y$$

$$u'v' \text{ to } xy \text{ conversion}$$

$$x = \frac{9u'}{6u' - 16v' + 12}$$

$$y = \frac{4v'}{6u' - 16v' + 12}$$

$$xy \text{ to } u'v' \text{ conversion}$$

$$u' = \frac{4x}{-2x + 12y + 3}$$

$$v' = \frac{9y}{-2x + 12y + 3}$$

$$xy \text{ to } CCT \text{ conversion}$$

$$CCT(k) = 437n^3 + 3601n^2 + 6831n + 5517,$$

$$n = \frac{x - 0.3320}{0.1858 - y}$$

In addition to these, the image characteristics determining unit 122 may calculate a color temperature or other factor using various conversion equations such as [adobe RGB→XYZ], [CIELAB→LCh, XYZ], [CIELUV→XYZ], [CMY→CMYK, RGB], [CMYK→CMY], [HIS→RGB], [IPT→XYZ], [LMS→XYZ], [RGB→CMY, CMYK, HIS, HSV, XYZ], [XYZ→Adobe RGB, CIELAB, CIELUV, IPT, LMS, sRGB], [Yxy→XYZ], etc., and use the calculated color temperature or factor in determining image characteristics.

Moreover, the image characteristics determining unit 122 may determine a color temperature of a light source according to the standard of the light source, and determine image characteristics in the paper mode based on the determined color temperature. The following Table 1 shows color temperatures, tristimulus values, and chromaticity coordinates of general CIE light emitting objects.

TABLE 1

Correlated color temperature (CCT), tristimulus values, CIE 1931 xy, and CIE 1976 u'v' chromaticity coordinates of general CIE light emitting object

| Light emitting | CCT | Tristimulus values | | | Chromaticity coordinates | | | |
|---|---|---|---|---|---|---|---|---|
| object | (K) | X | Y | Z | x | y | u' | y' |
| A | 2856 | 109.85 | 100.00 | 35.58 | 0.45 | 0.41 | 0.26 | 0.52 |
| B | 4874 | 99.10 | 100.00 | 85.32 | 0.35 | 0.35 | 0.21 | 0.49 |
| C | 6774 | 98.07 | 100.00 | 118.22 | 0.31 | 0.32 | 0.20 | 0.46 |
| D50 | 5003 | 96.42 | 100.00 | 82.51 | 0.35 | 0.36 | 0.21 | 0.49 |
| D55 | 5503 | 95.68 | 100.00 | 92.14 | 0.33 | 0.35 | 0.20 | 0.48 |
| D65 | 6504 | 95.04 | 100.00 | 108.88 | 0.31 | 0.33 | 0.20 | 0.47 |
| D75 | 7504 | 94.97 | 100.00 | 122.61 | 0.30 | 0.32 | 0.19 | 0.46 |
| E | 5400 | 100.00 | 100.00 | 100.00 | 0.33 | 0.33 | 0.21 | 0.47 |
| F2 | 4230 | 99.20 | 100.00 | 67.40 | 0.37 | 0.38 | 0.22 | 0.50 |
| F7 | 6500 | 95.05 | 100.00 | 108.72 | 0.31 | 0.33 | 0.20 | 0.47 |
| F11 | 4000 | 100.96 | 100.00 | 64.37 | 0.38 | 0.38 | 0.23 | 0.50 |

Referring to Table 1, the light emitting objects of Table 1 are standard light emitting objects which are commonly used in the art. For example, A denotes characteristics of an incandescent lamp, D denotes characteristics of natural light based on time, and F denotes characteristics of a fluorescent lamp. The image characteristics determining unit 122 may calculate a color temperature or other factor and use the calculated color temperature or factor in determining image characteristics. Also, the image characteristics determining unit 122 may determine a color temperature of a light source according to the standard of the light source, and determine image characteristics in the paper mode based on the determined color temperature.

The paper mode has a contrast ratio different from that of general display devices in that the paper mode is meant to imitate characteristics of printed matter. In a default image quality of the general display devices, it has been attempted to implement the minimum luminance closest to 0 nit for implementing the maximum darkness. Therefore, in the default image quality of the general display devices, as a C/R becomes higher, a corresponding display device is evaluated to have better performance. Additionally, in the default image quality of the general display devices, the display devices have a C/R of about 1,000:1 or more. However, as a calculation result of a C/R of printed matter, a contrast ratio of about 20:1 to 100:1 is preferable to express a feeling of the printed matter. An image close to the printed matter may be imitated by applying image characteristics in consideration of the reflectance characteristics of ink.

Figure 10:
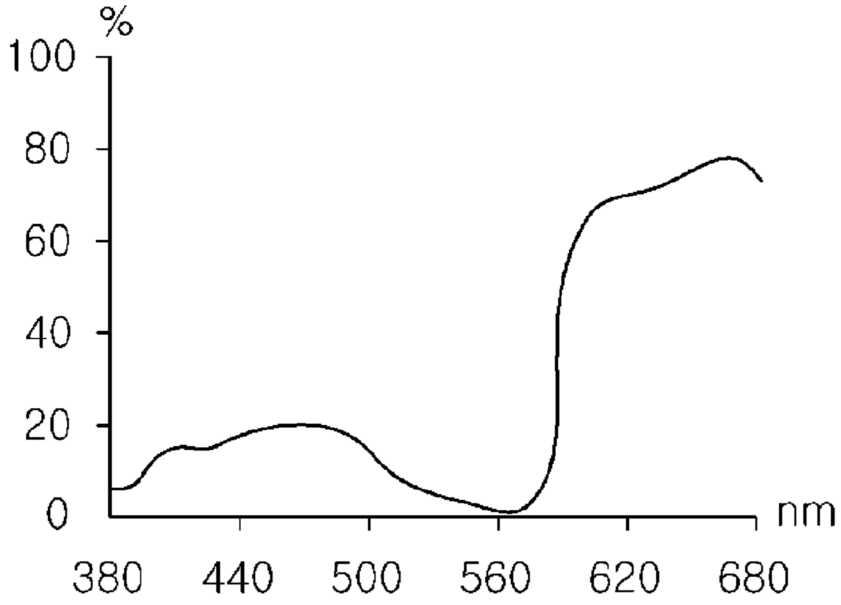
FIG. 10 illustrates reflectance by wavelength of magenta.
Figure 11:
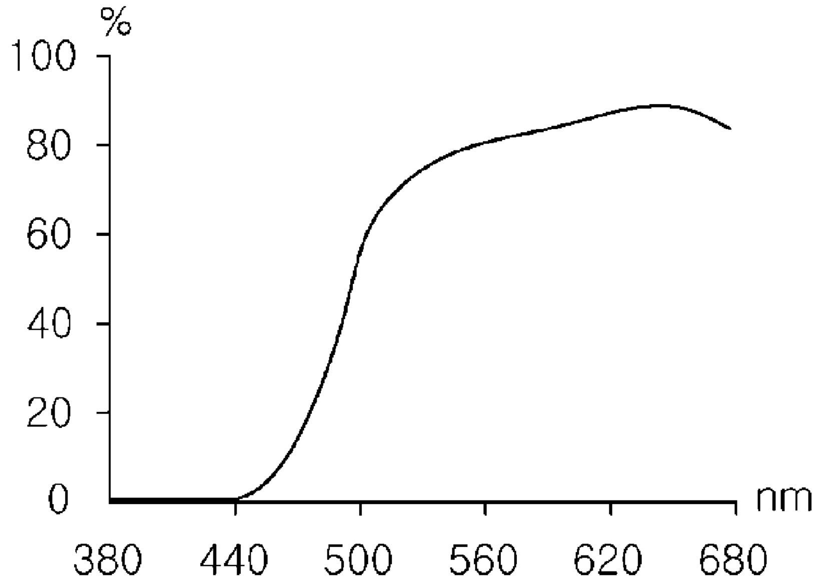
FIG. 11 illustrates reflectance by wavelength of yellow.
Figure 12:
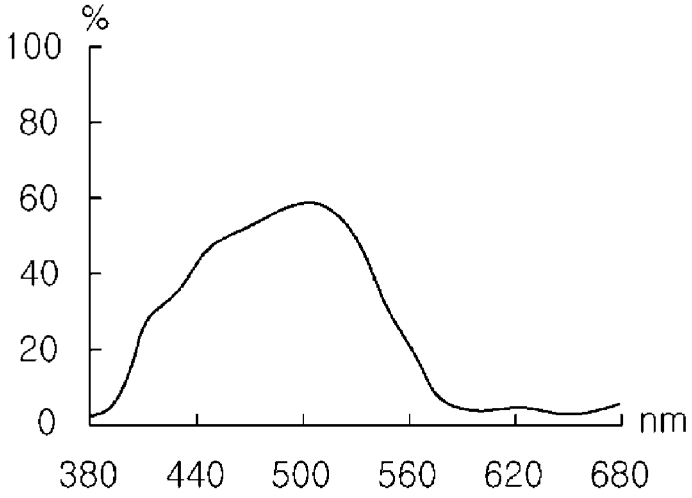
FIG. 12 illustrates reflectance by wavelength of cyan.

Equation 3 of FIG. 1D is an equation for determining a C/R of a display image with reflectance characteristics of printing ink as a constant. For example, an ink used for paper may be any of cyan, magenta, yellow, and black. FIG. 10 illustrates reflectance by wavelength of magenta. FIG. 11 illustrates reflectance by wavelength of yellow. FIG. 12 illustrates reflectance by wavelength of cyan. Referring to FIGS. 10-12, the ink has different reflectance by wavelength, and each color of the ink reflects lighting by wavelength to display a color. An x-coordinate indicates a wavelength (nm) of visible light, and a y-coordinate indicates reflectance (%).

The display device 100 according to one exemplary embodiment of the present disclosure is a self-emitting display device, which has a C/R lower than that of paper because light emission is limited in displaying black. In self-emitting display devices, reflectance of various printing inks may be applied as variables or constants to Equation 3 for expressing image characteristics of paper. Since paper has relatively higher reflectance than the self-emitting display device, the paper has a higher black value or minimum luminance value than the self-emitting display devices. To reflect such characteristics, the minimum luminance value in the paper mode of the display device 100 is set by measuring or calculating a black reflectance of printed matter. The minimum luminance value in the paper mode may be variously set depending on characteristics of ink.

To determine the minimum brightness values of the paper mode for red (R), green (G) and blue (B) sub-pixels of a display pixel based on a light reflectance rate of an ink type and the ambient light characteristics, the reflectance of visible wavelength of the ink and the ambient light intensity distribution of visible wavelength can be used. By multiplying the reflectance of visible wavelength and ambient light intensity distribution of visible wavelength, the image characteristic determining unit 122 can simulate the reflected ambient light.

The sum of reflectance by wavelength of cyan, magenta and yellow is the reflectance by wavelength of black.

Simulating the minimum brightness values is similar to the simulating the maximum brightness values as described above.

The image characteristic determination unit 122 scales red, green and blue (RGB) color values of image data associated with the sub-pixels of each of the display pixels in reference to the maximum brightness values and the minimum brightness values.

The simulation of the optical characteristics of the reflected ambient light on paper and the simulation of the optical characteristics of the ambient light on an ink may be implemented solely but they can also be implemented concurrently. The order of the implementation can also vary, for example, the simulation of the optical characteristics of the reflected ambient light on paper can be done first then the simulation of the optical characteristics of the ambient light on an ink can be done or vice versa.

To provide a description with reference to FIG. 1E, when illumination of ambient light measured from a sensor is 400 lux and a color temperature of the ambient light is 3,800 K, the paper mode may have image characteristics in which the maximum luminance is 50 nits and a C/R is 22:1. In this case, the minimum luminance in the paper mode may be 2.3 nits. In other words, when R, G, and B values of an input image in the paper mode are [255, 255, 255], luminance of the display device 100 is 50 nits. Also, when R, G, and B values of an input image in the paper mode are [0, 0, 0], luminance of the display device 100 is 2.3 nits.

Referring again to FIG. 1D, the image characteristics determining unit 122 may calculate a target C/R value, a target color temperature, and target luminance of image characteristics in the paper mode based on Equations 1, 2, or 3 using the plurality of factors 110.

In FIG. 1D, image characteristics include luminance, a C/R, and a color temperature, and may include various image characteristics such as definition without being limited thereto. The plurality of factors 110 may include an additional adjustment factor which is determined based on various image-quality evaluations. For example, luminance of an image in the paper mode is relatively lower under a low color temperature and low illumination (compared to that under a high color temperature and high illumination), and thus the C/R will also be determined to be lower. Various image quality modes may be relevant to different image characteristics, which may be adjusted by different factors.

Also, the image characteristics determining unit 122 may apply weight to each of the plurality of factors 110 to determine image characteristics. In Equations 1 to 3 of FIG. 1D, different weights may be applied to illumination and a color temperature. For example, when a color temperature is a more important factor than illumination, higher weight may be applied to the color temperature.

When the plurality of factors 110 is weather information (provided from the GPS module) incapable of being expressed numerically, respective weather factors may be defined to have predetermined variable values. The defined values may be mapped on a look up table (LUT). The image characteristics determining unit 122 of the display device 100 according to one exemplary embodiment of the present disclosure may substitute the plurality of obtained factors 110 into the above-described equations to determine image characteristics.

FIG. 1E is a look up table (LUT) for describing an aspect in which the image characteristics determining unit of the display device according to one exemplary embodiment of the present disclosure determines image characteristics.

When the plurality of factors 110 are factors capable of being expressed numerical, a numerical range thereof is defined, and a look up table (LUT) in which image characteristics corresponding to the numerical range are defined may be stored, for example, in a memory. The display device 100 may include a configuration in which a look up table (LUT) with at least two factors mapped thereon is stored.

Referring to FIG. 1E, as an example, a look up table (LUT) in which image characteristics corresponding to a range of a color temperature of ambient light obtainable from the color temperature sensor and a range of illumination of the ambient light obtainable from the illumination sensor are defined is shown. In the look up table (LUT) of FIG. 1E, each column lists image characteristics corresponding to illumination values within a certain range, and each row lists image characteristics corresponding to color temperature values within a certain range.

Referring again to FIG. 1E, the image characteristics include luminance, a C/R, and a color temperature, and may include various image characteristics such as a definition, texture, etc. without being limited thereto. The image characteristics may be determined based on various types of image analysis, an ambient environment, etc. Also, a contrast ratio may be additionally determined to be higher for readability of printing type. In increasing a contrast ratio, especially when a device is determined to be disposed outdoors by the GPS sensor or the illumination sensor, visibility of an image can be reduced by ambient light, and for this reason, a C/R may be set higher. Various image quality modes may be relevant to different image characteristics, which may be adjusted by different factors.

The plurality of factors 110 may not be expressed numerically. For example, the plurality of factors 110 may be weather information collected in association with illumination of ambient light and position information 114 from the GPS module. Even in this case, a look up table (LUT) may be defined based on a numerical range of each weather factor and illumination of ambient light. The look up table (LUT) based on weather or ambient light will be described below with reference to FIG. 2C.

The image characteristics determining unit 122 of the display device 100 according to one exemplary embodiment of the present disclosure may substitute the obtained plurality of factors 110 into the above-described equations to determine image characteristics. For example, referring to FIG. 1E, when measured illumination of ambient light is 550 lux and a measured color temperature of the ambient light is 4,600 K, the paper mode may be determined to have image characteristics in which luminance is 100 nits, a C/R is 30:1, and a color temperature is 4,500 K.

Figure 1F:
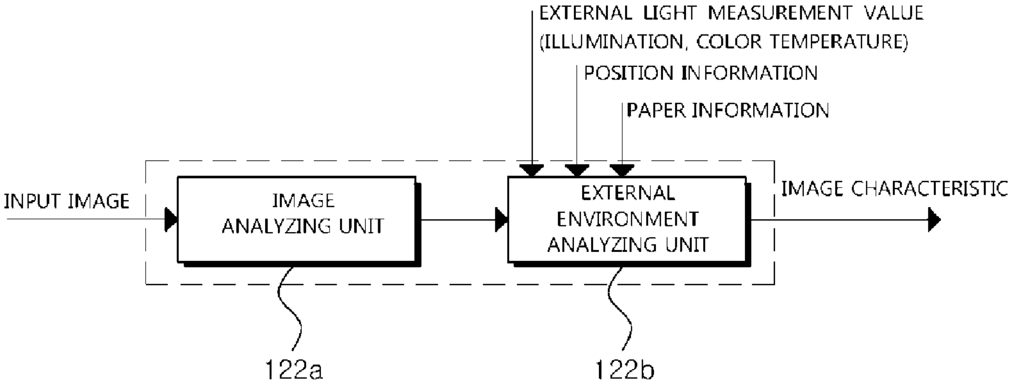
FIG. 1F is a block diagram illustrating an exemplary aspect of the image characteristics determining unit of the display device according to one exemplary embodiment of the present disclosure.

FIG. 1F is a block diagram illustrating an exemplary aspect of the image characteristics determining unit of the display device according to one exemplary embodiment of the present disclosure.

In an exemplary aspect of the image characteristics determining unit 122 of the display device 100 according to one exemplary embodiment of the present disclosure, the plurality of factors 110 include illumination and a color temperature of ambient light, position information from the GPS module, a current time, a type of paper, and image analysis, and will be described below with reference to FIG. 1F.

Referring to FIG. 1F, the image characteristics determining unit 122 of the display device 100 according to one exemplary embodiment of the present disclosure includes an image analyzer 122*a* and an ambient environment analyzer 122*b*. The image characteristics determining unit 122 may determine image characteristics of an image quality mode based on the plurality of factors 110, and the plurality of factors 110 may include illumination and a color temperature of ambient light, position information from the GPS module, a current time, a kind of paper, and image analysis based on a histogram.

The image analyzer 122*a* of the image characteristics determining unit 122 of the display device 100 according to one exemplary embodiment of the present disclosure receives and analyzes an input image to determine whether the input image is an image including text. A detailed method of analyzing an input image to determine whether the input image is an image including text will be described below with reference to FIGS. 2E and 2F.

When the image analyzer 122*b* of the image characteristics determining unit 122 determines that the input image relates to text, the image characteristics determining unit 122 determines the image characteristics of the image mode by considering ambient light measured by the image analyzer 122*b*, position information from the GPS module and the preset paper type.

The ambient environment analyzer 122*b* of the image characteristics determining unit 122 according to one exemplary embodiment of the present disclosure may determine image characteristics of an image quality mode based on measured illumination and a color temperature of ambient light and the preset paper type. When the measured color temperature of the ambient light becomes lower, the ambient environment analyzer 122*b* may adjust a color temperature of the image quality mode to be lower, and when the measured color temperature becomes higher, the ambient environment analyzer 122*b* may adjust the color temperature of the image quality mode to be higher. The ambient environment analyzer 122*b* may combine the measured color temperature with the measured illumination of the ambient light to adjust luminance, a C/R, or the like, in addition to the color temperature of the image quality mode.

The ambient environment analyzer 122*b* of the image characteristics determining unit 122 according to one exemplary embodiment of the present disclosure may determine whether the display device 100 is disposed indoors or outdoors based on position information from the GPS/communication module, and combine the determined result with current time information to estimate a current color temperature of ambient light. The estimated color temperature may be separately used to determine image characteristics of an image instead of a color temperature measured by the light sensor. Image characteristics may be determined based on the estimated color temperature, which may be used to compensate for the determined image characteristics using the measured color temperature. The ambient environment analyzer 122*b* may compare the estimated color temperature with the measured color temperature, and use the compared result in image characteristics operation.

The ambient environment analyzer 122*b* of the image characteristics determining unit 122, as described above, may combine the plurality of factors 110 in various methods to provide the optimal image quality mode suitable for an ambient environment.

Figure 1G:
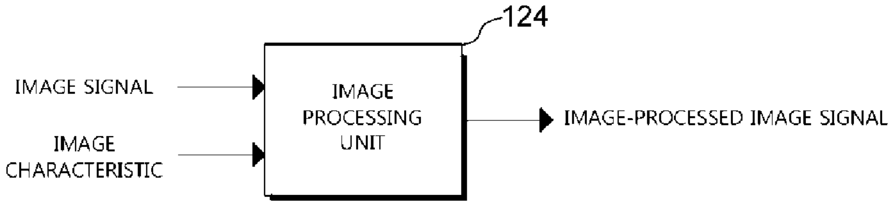
FIG. 1G is a block diagram illustrating an exemplary aspect of an image processor of the display device according to one exemplary embodiment of the present disclosure.

FIG. 1G is a block diagram illustrating an exemplary aspect of an image processor of the display device according to one exemplary embodiment of the present disclosure. The image processor 124 converts an input image so as to implement the image characteristics determined by the image characteristics determining unit 122.

In a method in which the image processor 124 converts an input image so as to implement the determined image characteristics, there may be a method using a look up table (LUT) or a method using an equation. Hereinafter, the method using the look up table (LUT) and the method using the equation will be described.

FIG. 1H is a look up table (LUT) for describing an aspect in which the image processor of the display device according to one exemplary embodiment of the present disclosure converts an input image to implement determined image characteristics. In FIG. 1H, each row lists gradation values of a conversion image corresponding to gradation values of an input image, and each column lists output values corresponding to a series of input values based on a designated image characteristics. In FIG. 1H, luminance, a C/R, and a color temperature are shown as determined image characteristics, but various image characteristics such as a definition determined by the image characteristics determining unit 122 may be included in the look up table (LUT) without being limited thereto.

Referring to FIG. 1H, the input image may have 2n (where n is a natural number) gradation values. The gradation is a brightness level of an image to be displayed by the display device 100, and is generally implemented as a digital value. The input image includes gradation information as a digital value.

Such a look up table (LUT), for example, may be stored in a memory. The display device 100 may use the look up table (LUT) which enables an input image to be scaled or converted according to a plurality of image characteristics. Also, the look up table (LUT) may be generated using Equation 7, 8, 9, 10, 11, or 12 to be described below.

The image processor 124 of the display device 100 according to one exemplary embodiment of the present disclosure may apply the input image to the look up table (LUT) to scale or convert the input image according to determined image characteristics. Referring to FIG. 1H, in order for the input image to have luminance of 110 nits, a C/R of 22:1, and a color temperature of 3,800 K in the paper mode, gradation values "0, 1, 2, 3, . . . , 255" of the input image may be scaled to or converted into gradation values "3, 4, 5, 7, . . . , 240" of the input image converted into the paper mode. The display device 100 may display an input image with the converted gradation values of the input image applied thereto, thereby implementing image characteristics in the paper mode. Although not shown in FIG. 1H, conversion of gradation values for implementing image characteristics may be performed on R, G, and B, respectively.

In converting an input image to implement a determined image characteristics by the image processor 124 of the display device 100 according to one exemplary embodiment of the present disclosure, when the image characteristics are expected to change rapidly or it is likely to decrease a viewing continuity of a user, the image processor 124 may process an image in order for transition of a processed image to be naturally performed.

The image processor 124 of the display device 100 according to one exemplary embodiment of the present disclosure may use a look up table (LUT) optimized for the plurality of factors 110 through various experiments, so as to determine image characteristics giving a paper-like feeling. Also, an application order (i.e., the order in which the look up table (LUT) should be referred to) of a plurality of look up tables respectively corresponding to the plurality of factors 110 may be determined according to ambient environment obtainment information. Also, the final image characteristics may be determined according to an application order of the plurality of look up tables and a degree of application. Also, the plurality of look up tables are generated by analyzing a pattern in which a user arbitrarily re-sets an image converted by the processing unit 120. FIG. 1I illustrates equations for describing an aspect in which the image processor of the display device according to one exemplary embodiment of the present disclosure converts an input image to implement a determined image characteristics.

An equation for changing an input image may be defined with respective image characteristics determined by the image characteristics determining unit 122 as variables.

The image processor 124 of the display device 100 according to one exemplary embodiment of the present disclosure may calculate the maximum gradation value and minimum gradation value of each of R, G, and B which are variables of an input image conversion equation used to implement image characteristics determined by the image characteristics determining unit 122 in the display device. The image processor 124 may determine the R maximum gradation value (Rmax), the G maximum gradation value (Gmax), the B maximum gradation value (Bmax), the R minimum gradation value (Rmin), the G minimum gradation value (Gmin), and the B minimum gradation value (Bmin) which satisfy the image characteristics determined by the image characteristics determining unit 122, and by applying the above-described minimum gradation values and maximum gradation values to Equations 7 to 9, the image processor 124 may scale the input image to imitate the image printed on physical paper in the same ambient light conditions. The converted image gradation value referred as the scaled RGB color values. The scaled RGB color values activate the each of display pixels. The maximum gradation values Rmax, Gmax and Bmax is the maximum brightness values for the display device using the paper mode. The minimum gradation values Rmin, Gmin and Bmin is the minimum brightness values for the display device using the paper mode.

For example, the above-described minimum gradation values and maximum gradation values may be calculated through a series of operations to be described below. A color temperature difference between a default image characteristics of the display device 100 and image characteristics determined by the image characteristics determining unit 122 may be calculated to implement the image characteristics determined by the image characteristics determining unit 122. A CIE xy chromaticity coordinate value difference between the default image characteristics and the image characteristics determined by the image characteristics determining unit 122 may be calculated using the calculated color temperature difference. An XYZ tristimulus value difference between the default image characteristics and the image characteristics determined by the image characteristics determining unit 122 may be calculated using the calculated CIE xy chromaticity coordinate value difference. Respective differences between R, G, and B gradation values implementing the default image characteristics and R, G, and B gradation values having gradation values of a converted image implementing the image characteristics determined by the image characteristics determining unit 122 may be calculated using the XYZ tristimulus value difference.

The maximum gradation values (Rmax), (Gmax), and (Bmax) of R, G, and B may be calculated using the calculated R, G, and B gradation value differences. For example, the minimum gradation values (Rmin), (Gmin), and (Bmin) of R, G, and B may be calculated using the C/R image characteristics determined by the image characteristics determining unit 122 of the display device 100 and the above-calculated maximum gradation values (Rmax), (Gmax), and (Bmax), for implementing the C/R image characteristics determined by the image characteristics determining unit 122.

Referring to FIG. 1I, Equation 4 for determining the maximum gradation value (Gmax) and Equation 5 for determining the minimum gradation value (Gmin) with luminance, a C/R, and a color temperature (which are image characteristics determined as an example) as variables are shown. Also, Equation 6 for converting an input gradation value (Gin) into an output gradation value (Gout) using the maximum gradation value (Gmax) and minimum gradation value (Gmin) is shown.

The image processor 124 of the display device 100 according to one exemplary embodiment of the present disclosure may substitute the input gradation value (Gin) into Equation 6 including the determined maximum gradation value (Gmax) and minimum gradation value (Gmin), thereby calculating the output gradation value (Gout). The image processor 124 may convert gradation values of the input image so as to have the determined image characteristics using only the respective maximum gradation values and minimum gradation values of R, G, and B and a conversion equation based on the determined image characteristics.

To provide a more detailed description, Equations 7 to 9 denote RGB gradation data calculation equations using the maximum gradation data and the minimum gradation data.

$$R_{output} = R_{min} + \frac{R_{max} - R_{min}}{2^n - 1} \times R_{input} \quad \text{Eqn (7)}$$

$$G_{output} = G_{min} + \frac{G_{max} - G_{min}}{2^n - 1} \times G_{input} \quad \text{Eqn (8)}$$

$$B_{output} = B_{min} + \frac{B_{max} - B_{min}}{2^n - 1} \times B_{input} \quad \text{Eqn (9)}$$

The Rmax, the Gmax and the Bmax denote the maximum gradation values for the RGB sub-pixels of the display pixel, wherein the Rmin, the Gmin and the Bmin denote the minimum gradation values for RGB sub-pixels of the display pixel, wherein the Rinput, the Ginput and the Binput denote the RGB color values of image data associated with the corresponding sub-pixels of each of the display pixels, and wherein the Routput, the Goutput and the Boutput denote the scaled RGB color values.

Through the Equation 7 to 9, the values acquired from the simulation of the ink type and paper type can be utilized to imitate the optical characteristics of paper on the display device 100.

Among the tristimulus values "XYZ" of the display device 100 according to one exemplary embodiment of the present disclosure, a Y value may denote luminance of a display image. A measured luminance of the display device 100 may be determined by applying weight to the Y value. For example, in an LCD device, luminance is determined by a light transmittance which is adjusted by controlling liquid crystal of a panel based on RGB gradation values of an input image. However, a measured luminance of the LCD device is changed according to a voltage, applied to a light source of backlight of the LCD device, or a pulse width modulation (PWM) duty to be described below. Alternatively, in an OLED device, the measured luminance is changed based on gradation values of an input image according to a change in the maximum gamma voltage from a gamma voltage generator of the OLED device or a change in a voltage difference between an anode electrode and a cathode electrode. Therefore, such factors are set as weights, and the image processor 124 may be controlled to have image characteristics determined by the image characteristics determining unit 122.

For example, when determined image characteristics include luminance of 100 nits, a C/R of 50:1, and a color temperature of 5,000 K, the maximum gradation values of R, G, and B with the determined image characteristics reflected therein may be [250, 231, 212] (with respect to 256 levels), and the minimum gradation values of R, G, and B with the determined image characteristics reflected therein may be [28, 25, 26]. Also, a weight value may be determined for adjusting luminance. When using Equations 7 to 9, only the minimum gradation values and maximum gradation values of R, G, and B may be determined, and then an input image may be image-processed to have the determined image characteristics. That is, once only the minimum gradation values and maximum gradation values of R, G, and B for implementing the image characteristics are determined, a value therebetween may be calculated through Equations 7 to 9 without a separate look up table (LUT) or equation.

In the display device 100 according to one exemplary embodiment of the present disclosure, a number of image characteristics may be determined by combination of the plurality of factors 110. A configuration that converts an input image using Equations 7 to 9 is implemented once only the minimum gradation values and maximum gradation values of R, G, and B are determined, and thus resources used to process the input image may be saved by applying different functions for each image characteristics. The minimum gradation values and maximum gradation values of R, G, and B may be determined by the processing unit 120, or may be determined in manufacturing and stored in a memory.

When conversion of an input image is performed in hardware by a driver for a panel, the following Equations 10 to 12 may be used instead of Equations 7 to 9.

$$R_{output} = R_{min} + \frac{R_{max} - R_{min}}{2^n} \times (R_{input} + 1) \qquad \text{Eqn (10)}$$

$$G_{output} = G_{min} + \frac{G_{max} - G_{min}}{2^n} \times (G_{input} + 1) \qquad \text{Eqn (11)}$$

$$B_{output} = B_{min} + \frac{B_{max} - B_{min}}{2^n} \times (B_{input} + 1) \qquad \text{Eqn (12)}$$

When a configuration of converting an input image is implemented in hardware using Equations 10 to 12, R, G, and B values may be calculated through a shift operation with no pipeline divider, thus saving resources.

The processing unit 120 of the display device 100 according to one exemplary embodiment of the present disclosure may determine image characteristics of an image quality mode based on the plurality of factors 110, and convert an input image based on the determined image characteristics, thereby adjusting the image characteristics of the image quality mode in consideration of various environmental factors or displayed content.

Moreover, the image processor 124 according to one exemplary embodiment of the present disclosure may image-process RGB gradation values of the input image to convert the RGB gradation values into R'G'B' gradation values, so as to implement the image characteristics determined by the plurality of factors 110.

Generally, LCD devices or OLED devices are used with a standard color temperature value set within a range of 6,000 K to 7500 K. A color temperature of paper is 3,000 K to 5,000 K generally. Referring again to FIG. 9, reflectance by wavelength of papers is rapidly reduced at or below 440 nm, and thus, since a blue wavelength reflectance becomes lower, the paper has a color temperature lower than that of the LCD devices or the OLED devices.

The image processor 124 may analyze a unique color temperature of the display device 100 and a target color temperature in the paper mode for image-processing for implementing image characteristics in the paper mode. Also, the image processor 124 may analyze a unique C/R and luminance of the display device 100 and a target C/R and luminance in the paper mode.

The image processor 124 may convert the unique color temperature and target color temperature of the display device 100 into CIE u'v' chromaticity coordinates or CIE xy chromaticity coordinates through an equation. The image processor 124 may convert the CIE u'v' chromaticity coordinates or CIE xy chromaticity coordinates into XYZ tristimulus values. The image processor 124 may convert the XYZ tristimulus values into sRGB or RGB values with reference to the following conversion equations.

XYZ to sRGB Conversion $$\begin{bmatrix} sR \\ sG \\ sB \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix}$$

XYZ to RGB Conversion $$\begin{bmatrix} R \\ G \\ B \end{bmatrix} = \begin{bmatrix} 3.2405 & -1.5371 & -0.4985 \\ -0.9693 & 1.8760 & 0.0416 \\ 0.0556 & -0.2040 & 1.0572 \end{bmatrix} \begin{bmatrix} X \\ Y \\ Z \end{bmatrix}$$

The image processor 124 may analyze a C/R, luminance, and a color temperature and perform an arithmetic operation on gradation values of R, G, and B to calculate R', G', and B' values. For example, a mode may have a target color temperature of 4,000 K, a target C/R of 30:1, and target luminance of 150 nits, and the display device 100 may have a unique color temperature of 7,000 K, a unique C/R of 1,000:1, and unique luminance of 400 nits.

The image processor 124 may calculate u'v' coordinate values or xy coordinate values corresponding to the target color temperature of 4,000 K, and calculate u'v' coordinate values or xy coordinate values corresponding to the unique color temperature of 7,000 K.

The image processor 124 may calculate XYZ tristimulus values corresponding to the u'v' coordinate values or xy coordinate values calculated from the target color temperature of 4,000 K, and calculate XYZ tristimulus values corresponding to the u'v' coordinate values or xy coordinate values calculated from the unique color temperature of 7,000 K.

The image processor 124 may convert the XYZ tristimulus values corresponding to the target color temperature of 4,000 K into sRGB values. The image processor 124 may convert the XYZ tristimulus values corresponding to the unique color temperature of 7,000 K of the display device 100 into sRGB values.

The image processor 124 may compare the sRGB values corresponding to the target color temperature of 4,000 K and the sRGB values corresponding to the unique color temperature of 7,000 K to determine a degree of image-processing of an input image.

The image processor 124 may calculate a moving direction and change amount of each of unique values and target values of xy or u'v' chromaticity coordinates, and convert the moving direction and change amount into vector values. The image processor 124 may image-process RGB values of an input image based on the moving direction and change amount to convert the input image into an output image corresponding to a target color temperature.

The display device 100 according to one exemplary embodiment of the present disclosure can change luminance of a screen depending on ambient illumination through the above-described conversion, and moreover, implement an image quality mode optimized for the plurality of factors 110 and an image quality mode having a paper-like characteristic.

Figure 2A:
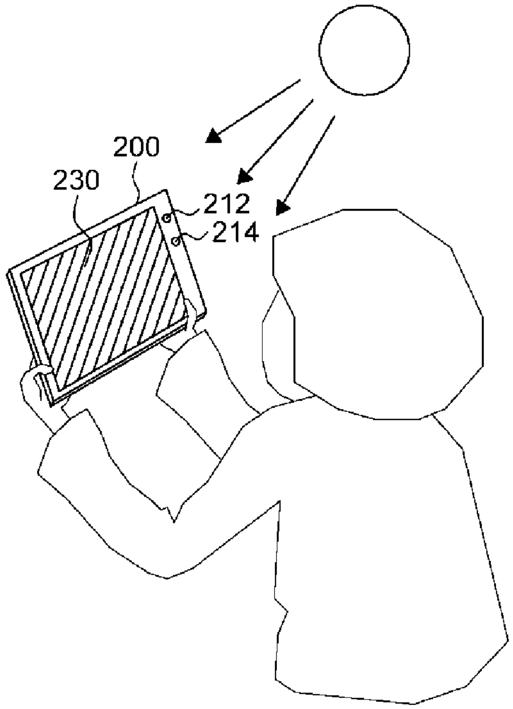
FIGS. 2A to 2G are schematic diagrams for describing a display device according to one exemplary embodiment of the present disclosure.

FIG. 2A is a schematic diagram for describing a display device according to one exemplary embodiment of the present disclosure. A display device 200 according to one exemplary embodiment of the present disclosure includes a front illumination sensor 212, a color temperature sensor 214, and a display unit 230.

A light sensor may measure the light incident on one plane of the display device 200. The light sensor may measure illumination, a color temperature, and color information of the incident light. The light sensor may output the measured characteristics of light as an analog value, which may be converted into a digital value by an analog-to-digital converter (ADC) and displayed in units of illumination. The converted value is input to a processing unit.

In the display device 200 according to one exemplary embodiment of the present disclosure, the light sensor is not limited in position. If the light sensor is disposed at one surface of the display device 200 and can measure light incident on the light sensor, the light sensor may be disposed without being limited in positions. In the display device 200 according to one exemplary embodiment of the present disclosure, the light sensor may be disposed at a front surface, rear surface, or side surface of the display device 200. For example, when the display device 200 includes a plurality of light sensors, the plurality of light sensors may be separately driven, and the display device 200 may recognize position information on the respective light sensors.

In FIG. 2A, the light sensor of the display device 200 is disposed in a non-display area of one surface of the display device 200. The light sensor may be disposed at a central portion of the display device 200 for more accurately measuring light incident on the display device 200.

Referring to FIG. 2A, the light sensor may be the front illumination sensor 212 or the color temperature sensor 214. In FIG. 2A, although the light sensor may be the front illumination sensor 212 or the color temperature sensor 214, the light sensor may be configured with at least one of a rear illumination sensor, an image sensor, a plurality of illumination sensors, a plurality of proximity sensors, and a color sensor.

The front illumination sensor 212 measures illumination of light incident on the front of the display device 100.

The color temperature sensor 214 measures a color temperature of light incident on the display device 200. Light incident on the display device 200 may be light emitted from various light sources. Incident light may have various color temperatures depending on a kind of light source. For example, since a color temperature of a fluorescent lamp is about 5,500 K but a color temperature of an incandescent lamp is about 2,800 K, a user may have different feelings in the same image quality mode due to different color temperatures even under the same illumination.

The color temperature sensor 214 of the display device 200 according to one exemplary embodiment of the present disclosure may be configured with an RGB sensor, or may be configured to measure a color temperature by combination of a plurality of the RGB sensors. The RGB sensor of the display device 200 may be an RGB sensor which is configured by combination of three colors respectively measuring R, G, and B color information. However, the RGB sensor may be configured as one color sensor, and may be an image sensor including a plurality of pixels.

Figure 2B:
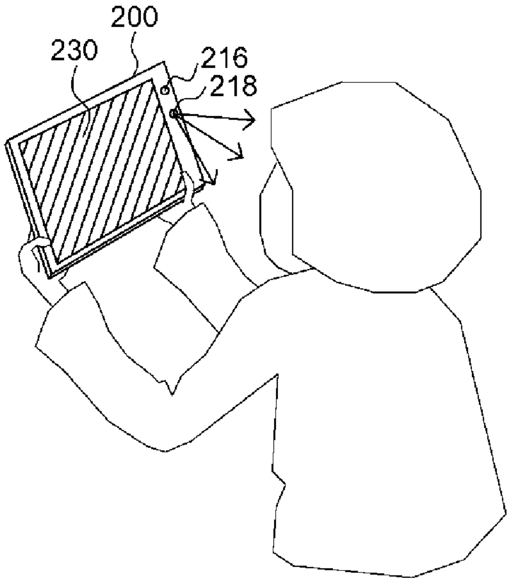

Referring again to FIG. 2A, the display device 200 measures illumination and a color temperature included in a plurality of factors, determines the optimized image characteristics of an image quality mode based on the measured color temperature, and converts and displays an image based on the determined image characteristics. A user can be provided with an image having desired image characteristics even under various light sources or illumination environment. FIG. 2B is a schematic diagram for describing a display device according to one exemplary embodiment of the present disclosure. A display device 200 according to one exemplary embodiment of the present disclosure includes an image sensor 216, a proximity sensor 218, and a display unit 230.

Referring to FIG. 2B, a light sensor may be the image sensor 216 disposed at a front surface of the display device 200. The image sensor 216 denotes a light sensor that converts two-dimensional (2D) or higher optical information into a time-series electrical signal. Since the image sensor 216 is disposed at the front surface of the display device 200, the image sensor 216 may obtain an image of a user in front of the display device 200.

Referring again to FIG. 2B, the light sensor may be the proximity sensor 218 disposed at the front surface of the display device 200. The proximity sensor 218 may include a light emitting part and a light receiving part. The proximity sensor 218 denotes a sensor that measures a distance or proximity based on an amount of reflected infrared light for sensing a distance or proximity between an object and the sensor. The light emitting part of the proximity sensor 218 emits light in one direction, and the emitted light reaches an object, is reflected by the object, and is incident on the light receiving part of the proximity sensor 218. The light receiving part may compare an amount of measured light and an amount of emitted light to measure a distance between the proximity sensor 218 and the object or whether the object is within a predetermined proximate distance. The proximity sensor 218 of FIG. 2B measures a distance between a user and the display device 200, and FIG. 2B illustrates that a distance between the display device 200 and the user is within a certain distance.

A processing unit of the display device 200 may determine image characteristics based on whether a user in front of the display device 200 is proximate to the display device 200. For example, when it is determined by the proximity sensor 218 that the user is close enough to the display device 200, the processing unit lowers luminance or a color temperature, and when it is determined that the user is far away from the display device 200, the processing unit increases luminance, a color temperature, and a C/R.

The processing unit of the display device 200 according to one exemplary embodiment of the present disclosure may obtain a user image and information on whether the user is proximate to the display device 200, included in a plurality of factors, and determines image characteristics based on the plurality of obtained factors. The processing unit of the display device 200, for example, may determine age and sex of the user from the obtained user image. A method of determining the sex or age of the user from the user image may be performed by template matching to be described below with reference to FIG. 2D, or performed in a scheme of extracting a feature of a user face and calculating a similarity or feature data for each sex or age to determine sex or age. Also, the processing unit of the display device 200 may determine the obtained proximity of the user.

The processing unit of the display device 200 may determine image characteristics of an image quality mode based on the obtained proximity and the obtained sex and age of the user, and convert an input image based on the determined image characteristics. The converted image may be displayed by the display unit 230, and the user may be provided with an image quality mode optimized for a distance between the user and the display device 200 and the sex and age of the user, or with an adjusted the optical characteristics of the image quality mode.

Figure 2C:
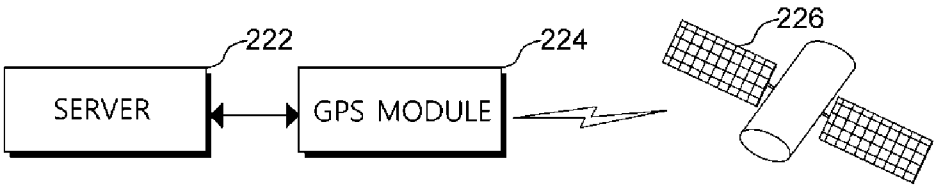

FIG. 2C is a schematic diagram for describing a display device according to one exemplary embodiment of the present disclosure. Referring to FIG. 2C, a server 222, a GPS module 224, and a satellite 226 are illustrated. The display device according to one exemplary embodiment of the present disclosure may include the GPS module 224.

The GPS module 224 receives position information from the satellite 226. The GPS module 224 transfers the received position information to a processing unit. The processing unit of the display device may calculate information associated with the received position information, and receive information on a current position of the display device from the server 222 based on the received position information.

The processing unit may determine whether a user's location is a house or a place of work, whether the user is moving, or whether the user is located indoors or outdoors, in association with the received location information. The user's location may be determined based on the existing accumulated location information. For example, when the existing user location information concentrates on two specific places, the processing unit may determine that one of the two places is the house and the other is the place of work. Whether the user is located indoors or outdoors may be determined by combination of the position information from the GPS module 224 and a wireless access point. The processing unit may communicate with the server 222 in association with the current position information, and receive weather information on a current position.

In the display device according to one exemplary embodiment of the present disclosure, the plurality of factors may include indoor/outdoor information and weather information based on the position information received from the GPS module 224. For example, when it is determined that the display device is disposed indoors, a factor corresponding to the weather information may be reflected lower than when it is determined that the display device is disposed outdoors. When it is determined that the display device is disposed outdoors, higher weight may be applied to the factor corresponding to the weather information, which may be reflected.

Figure 13:
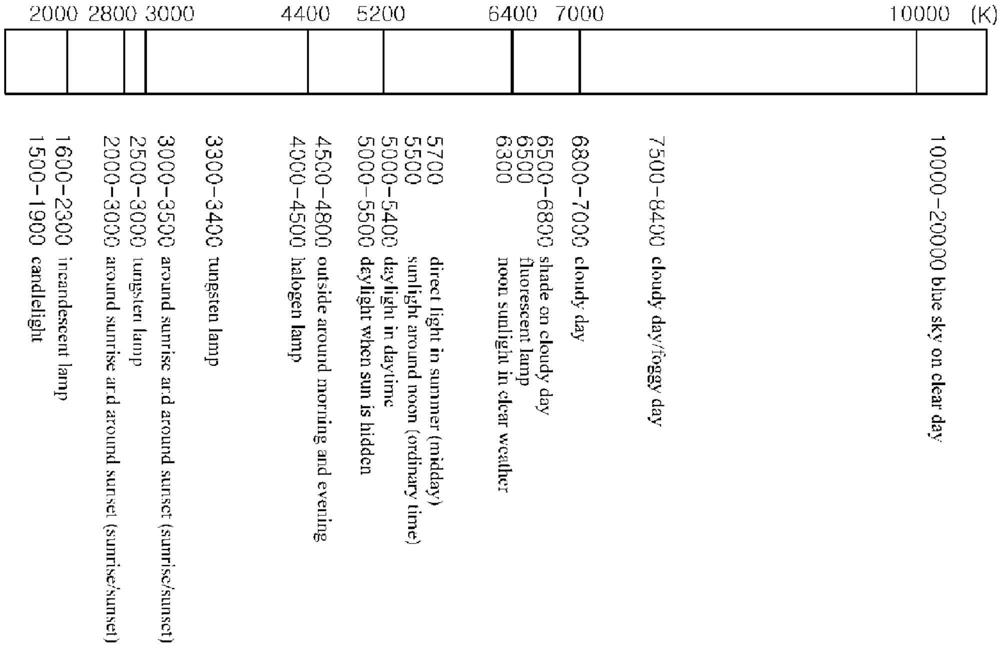
FIG. 13 illustrates a look up table (LUT) for determining image characteristics.

In the display device according to one exemplary embodiment of the present disclosure, according to the plurality of factors, the processing unit may determine whether the display device is disposed indoors or outdoors based on the position information received from the GPS module 224, and when the display device is disposed outdoors, the processing unit may estimate illumination and a color temperature of sunlight based on current time information and position information. As shown in FIG. 13, the processing unit may estimate a color temperature of ambient light based on time and weather information.

For example, when the display device is disposed outdoors based on the position information received from the GPS module 224 and information in which current weather is clear at noon (current time) is received from the server 222, the display device may estimate a color temperature of ambient light incident on the display device as 5,500 K.

The estimated color temperature is included in the plurality of factors, and may be separately used as a color temperature which is reference for determining image characteristics. Alternatively, the estimated color temperature may be combined with a color temperature measured by a sensor and used, or may be used as a color temperature for comparing with the measured color temperature.

Furthermore, the display device according to one exemplary embodiment of the present disclosure may further include an illumination sensor. When it is determined by other factors that the display device is disposed outdoors, the display device may determine whether the display device is disposed under sunlight or shade based on illumination information obtained from the illumination sensor, or may more finely adjust the image characteristics of the image quality mode based on an illumination measurement value.

The display device according to one exemplary embodiment of the present disclosure may use a look up table (LUT) for determining image characteristics based on the table in FIG. 13. An illumination reference look up table (LUT) may be generated with reference to Korean Industrial Standard "KS A3011, recommended levels of illumination" or ISO corresponding to the above-described measurement method. The display device according to one exemplary embodiment of the present disclosure may use a look up table (LUT) for determining image characteristics based on Table 1. The look up table (LUT) may include information on time, weather, illumination, and environment related to a color temperature. For example, when a value of the look up table (LUT) corresponding to a color temperature sensed by a color temperature sensor is measured as blue sky on a clear day, the display device may determine whether the display device is disposed indoors or outdoors using the GPS module. When it is determined to be outdoors, the display device may determine a color temperature of an image similarly to an image quality of paper under a blue sky on a clear day. Additionally, the display device may sense light using an illumination sensor, and may set luminance of an image similarly to reflectance characteristics of paper. Additionally, the display device may obtain time information through the illumination sensor and the GPS module, and thus set a C/R for improving visibility. For example, since it can be seen that ambient light in the afternoon is high, a high C/R may be set for improving visibility of the display device.

The processing unit of the display device may determine image characteristics of an image quality mode based on obtained indoor/outdoor position information and obtained weather information, and convert an input image based on the determined image characteristics. The converted image may be displayed by the display unit, and the user may be provided with an image quality mode optimized for the user's location and weather thereof, or with adjusted image characteristics of the image quality mode.

Figure 2D:
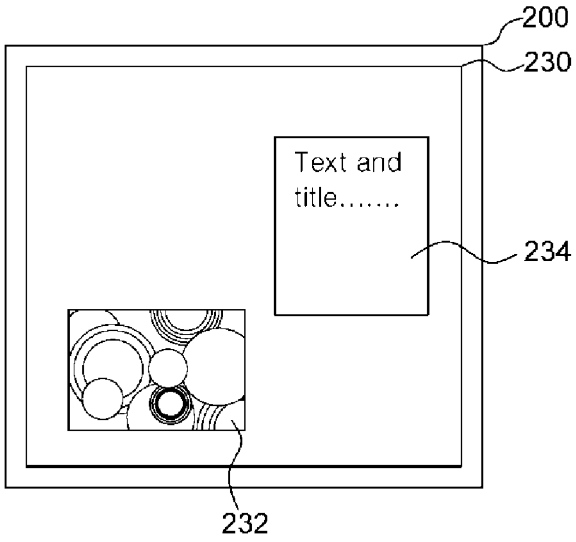

FIG. 2D is a schematic diagram for describing a display device according to one exemplary embodiment of the present disclosure. Referring to FIG. 2D, a display device 200 includes a display unit 230. Referring to FIG. 2D, the display unit 230 is illustrated as displaying a first image 232 and a second image 234.

In the display device 200 according to one exemplary embodiment of the present disclosure, at least one of a plurality of factors may be analysis of an input image or application information. The display device 200 may determine image characteristics of an image quality mode based on the plurality of factors including the analysis of the input image or the application information.

The display device 200 according to one exemplary embodiment of the present disclosure may analyze the first image 232 and the second image 234 to calculate a factor. The display device 200 may analyze the first image 232 and the second image 234 to obtain information on displayed content or an image.

In the specification, image analysis denotes detecting a similar feature or uniformity from a given image to analyze the detected feature or uniformity. An image analysis operation may use feature factors such as a color component, a boundary, texture, movement, depth information, significance, template matching, etc., and the feature factors may be used as criteria of uniformity.

The template matching algorithm refers to an algorithm that measures a template and similarity of an image from an entire image to classify or extract similar objects. The template may be an object that is high in a frequency of appearance in an image like a face, an icon, and a letter. The template matching algorithm may be useful to extract a standard object such as an icon, a program window, a person's face, a letter, or the like.

In the display device 200 according to one exemplary embodiment of the present disclosure, image characteristics of an image quality mode may be adjusted depending on an object extracted by the template matching algorithm. For example, when the first image 232 including a person's face and the second image 234 including a printing type are analyzed by the template matching algorithm, image characteristics of the image quality mode may be differently adjusted according to the analyzed result.

An object may be separated from an image using a boundary or an edge. In the image, the boundary includes much information on the image, and thus may be a factor that indicates a feature of the image. In the image, the boundary may provide contour information on objects composing the image, and moreover may be used to classify and separate the objects.

The image may include various color distributions. The display device 200 according to one exemplary embodiment of the present disclosure may analyze that an achromatic color distribution is high or a chromatic color distribution is high in a displayed image. When the achromatic color distribution is high, the display device 200 may predict the image as a black and white image or an image including text. The display device 200 may change a C/R according to the achromatic color distribution, and adjust a color reproduction rate according to the chromatic color distribution.

In FIG. 2D, operations of the display device 200 are implemented by an operating system (OS). When the application window is displayed in a portion of the display device 200, a plurality of executed applications may be simultaneously displayed in portions of the display device 200, and an area displaying each application may be defined by two coordinates (x, y-coordinates). The display device 200 may apply the predetermined image quality mode to only an area within the x, y-coordinates.

The first image 232 may be displayed by a first application, and the second image 234 may be displayed by a second application. The OS may supply information on the first and second applications to a processing unit. In the application information, the first application may be a photograph or a video viewer, and the second application may include an attribute called a text reader, or include only application name information. Alternatively, the application information may include information on an image displayed by the application.

In the display device 200 according to one exemplary embodiment of the present disclosure, the image characteristics may be adjusted according to image analysis and the application information. For example, when text is viewed in high weight in the web browser, the image characteristics of the image quality mode is adjusted for the text reading. When it is determined that video or a photograph is viewed in high weight in the web browser, the image quality mode may be immediately adjusted to an image quality mode optimized for an image.

Moreover, application information including position information on a display image may be obtained, and thus an object may be extracted from the image. For example, the application information may include x, y-axis coordinates of a rectangular application window displayed by the display device 200. The display device 200 may adjust image characteristics based on the obtained coordinate values, and image characteristics in each image quality mode may be determined by the same factor or different factors.

Figure 2E:
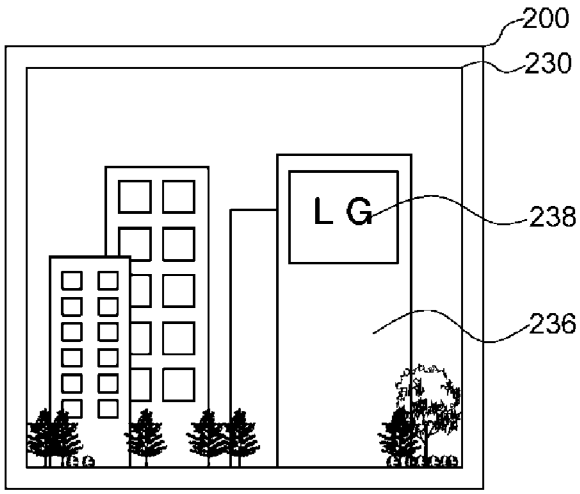

FIG. 2E is a schematic diagram for describing a display device according to one exemplary embodiment of the present disclosure. Referring to FIG. 2E, a display device 200 includes a display unit 230. Referring to FIG. 2E, the display unit 230 is illustrated as displaying an image 236 and a text area 238.

FIG. 2E is for describing image analysis that is one of a plurality of factors of the display device 200 according to one exemplary embodiment of the present disclosure. In an operation of determining whether the image 236 is text through image analysis, only a partial area may be recognized as the text area 238. Referring to FIG. 2E, the text area 238 displayed by the display unit 230 is merely a portion of the image 236. In a case of FIG. 2E, when only the text area 238 is implemented to have an adjusted image characteristics, naturalness of the image 236 can be degraded.

In the display device 200 according to one exemplary embodiment of the present disclosure, even when text is recognized through template matching or edge detection, when the text area 234 is determined as a portion of the image 236, a corresponding area can be determined as not being the text area 238.

Similarly, although various types of image analysis according to the present disclosure are performed for adjusting the image characteristics of the optimized image quality mode, adjustment of image characteristics may be performed within a range in which naturalness of the image 236 is maintained.

For example, when the image 236 is rapidly changed, the display device 236 may determine whether the image 236 is maintained for certain duration, and then adjust image characteristics of an image quality mode. When a change of the image characteristics is large enough, the display device 200 does not change the image characteristics to determined image characteristics but performs smooth transition to have medium image characteristics.

Figure 2F:
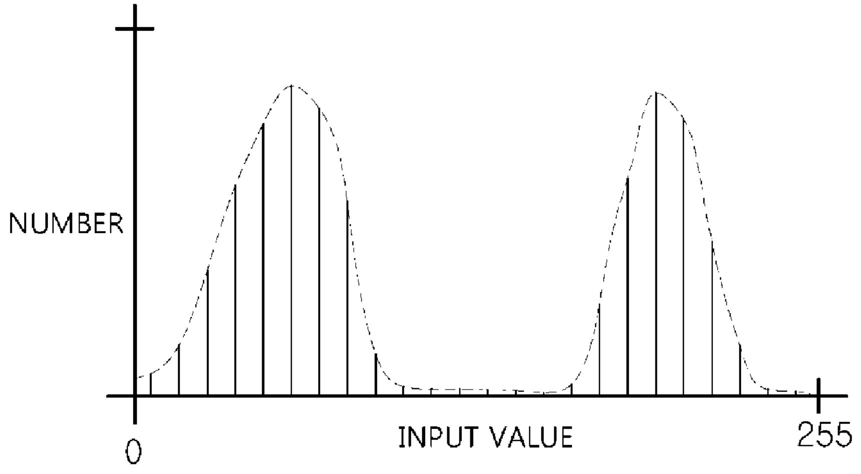
Figure 2G:
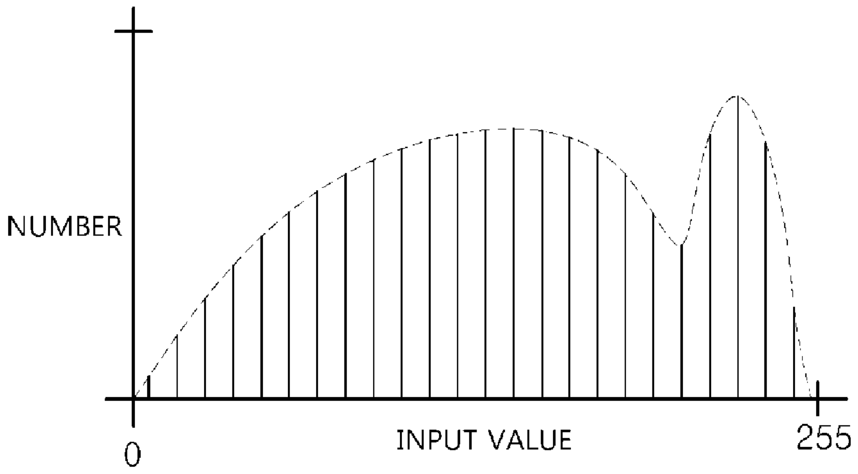

FIGS. 2F and 2G are schematic diagrams for describing image analysis in the display device 200 according to one exemplary embodiment of the present disclosure.

In the display device 200 according to one exemplary embodiment of the present disclosure, image analysis may be performed using a histogram. Histogram data of respective frames may be extracted from an input image.

The histogram denotes data generated by detecting the frequency of appearance of data in a unit area with 2n (for example, 256) luminance levels. An x-axis of the histogram indicates input values of 0 to 255, and is an axis indicating values from the darkest input value to the brightest input value of an image. A y-axis of the histogram indicates the frequency of pixel to each of the input values.

The processing unit of the display device 200 according to one exemplary embodiment of the present disclosure may perform various image analysis based on histogram data. FIG. 2F shows a histogram of an image including text. To describe the frequency of histogram, the frequency of pixel is high in input values of a low gradation and high gradation of the image, and is low in input values of an intermediate gradation. In the image analysis of the display device 200 according to one exemplary embodiment of the present disclosure, it may be provisionally determined through the histogram that the image includes the text.

FIG. 2G shows a histogram of an image including a photograph. To describe the frequency of histogram, the frequency of a pixel is distributed all over a gradation of an image. In the image analysis of the display device 200 according to one exemplary embodiment of the present disclosure, it may be provisionally determined through the histogram that the image does not include text.

Moreover, in the image analysis of the display device 200 according to one exemplary embodiment of the present disclosure, the histogram data may be analyzed for each of R, G, and B, and which color has a high distribution may be analyzed.

Referring to FIGS. 2F and 2G, whether an image includes text or a color distribution of the image may be analyzed through the histogram analysis, and the processing unit of the display device 200 may determine image characteristics of an image quality mode based on an image analysis result.

Figure 3:
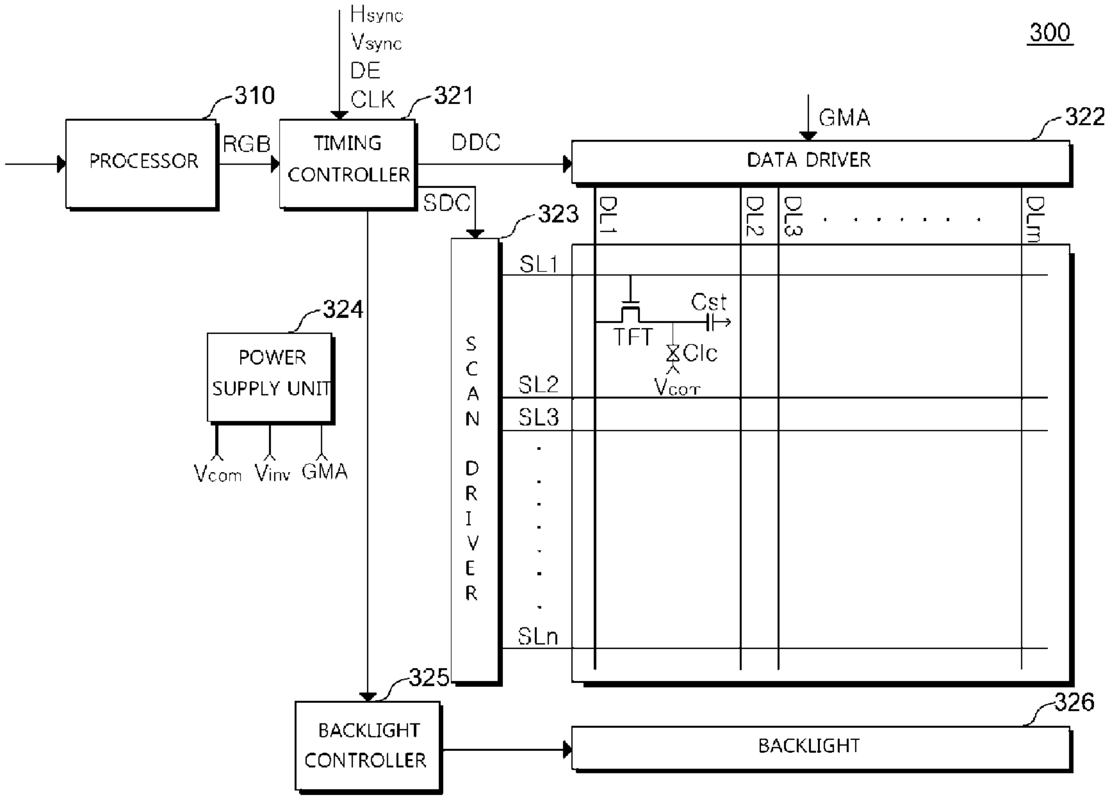
FIG. 3 is a block diagram illustrating an LCD device according to one exemplary embodiment of the present disclosure.

FIG. 3 is a block diagram illustrating an LCD device according to one exemplary embodiment of the present disclosure.

A LCD device 300 includes a processor 310, a timing controller 321, a display panel, a data driver 322, a scan driver 323, a backlight controller 325 and a backlight 325.

The processor 310 receives an input image and receives a plurality of factors. The processor 310 converts the input image as described above.

The timing controller 321 receives the converted input image. The timing controller 321 generates a source driver control signal (SDC) to control the scan driver 323, and generates a data driver control signal (DDC) to control the data driver 322.

The timing controller 321 generates the data control signal DDC and the scan control signal SDC based on a horizontal sync signal Hsync, a vertical sync signal Vsync, a data enable signal DE, and a clock signal CLK which are input thereto. The timing controller 321 supplies the scan control signal SDC for controlling the liquid crystal display panel to the scan driver 323, and supplies the data control signal DDC to the data driver 322.

The data driver 322 receives the DDC from the timing controller 321. The data driver 322 samples data and latches the sampled data in units of one line at every one horizontal period. The data driver 322 respectively supplies the latched data to a plurality of data lines DL1 to DLm according to the data control signal DDC. The data driver 322 converts received digital image data into an analog signal with gamma voltages GMA and respectively supplies the analog signal to the data lines DL1 to DLm.

The scan driver 323 drives a plurality of scan lines SL1 to SLn to enable data signals to be applied to respective sub-pixels corresponding to each of the scan lines. The scan driver 323 includes a shift register that sequentially generates a scan pulse in response to the SDC from the timing controller 321. The scan driver 323 sequentially supplies a scan voltage to the scan lines SL1 to SLn.

The power supply unit 324 supplies voltages to the data driver 322, the scan driver 323 and a liquid crystal panel. The power supply unit 324 supplies a common electrode voltage Vcom to a common electrode, supplies gamma voltages GMA to the data driver 322, and supplies a BL driving voltage (Vbl) to a backlight controller 325.

The backlight controller 325 controls voltage and duty to be supplied to the backlight 326. The backlight controller 325 outputs a voltage for adjusting brightness of the backlight 326 according to a backlight control voltage input from the timing controller. The backlight controller 325 may adjust a PWM duty signal input from the timing controller 321 to adjust brightness.

The backlight 326 includes a fluorescent lamp or light emitting diode (LED) for radiating light on the liquid crystal display panel. The backlight 326 receives a light emitting element driving voltage (Vbl) from a power generator.

The liquid crystal display panel includes a lower substrate, an upper substrate, a pixel electrode, a common electrode, a color filter, a polarizing film, and a liquid crystal layer disposed between the upper substrate and the lower substrate. An electric field is generated between the pixel electrode disposed in a pixel area of the liquid crystal panel and the common electrode formed in the lower substrate or the upper substrate. The pixels of the liquid crystal panel selectively transmit light which passes through the polarizing film according to a degree of control of the liquid crystal and is emitted from a separate light source. The selectively transmitted light passes through the color filter disposed in the upper substrate to enable the display of an image.

The liquid crystal display panel includes a plurality of scan lines SL1 to SLn, a plurality of data lines DL1 to DLm, and a plurality of sub-pixels. In FIG. 3, for convenience of description, one sub-pixel is illustrated. The scan lines SL1 to SLn extend in one direction. The data lines DL1 to DLm extend in another direction intersecting the one direction or in a direction parallel to the one direction. Each of the sub-pixels includes a thin film transistor TFT connected to a corresponding scan line and a corresponding data line. In the liquid crystal display panel, liquid crystal is injected between a lower substrate and a upper substrate. A storage capacitor Cst for holding a voltage of a corresponding liquid crystal cell Clc is formed in the upper substrate of the liquid crystal display panel.

Figure 4:
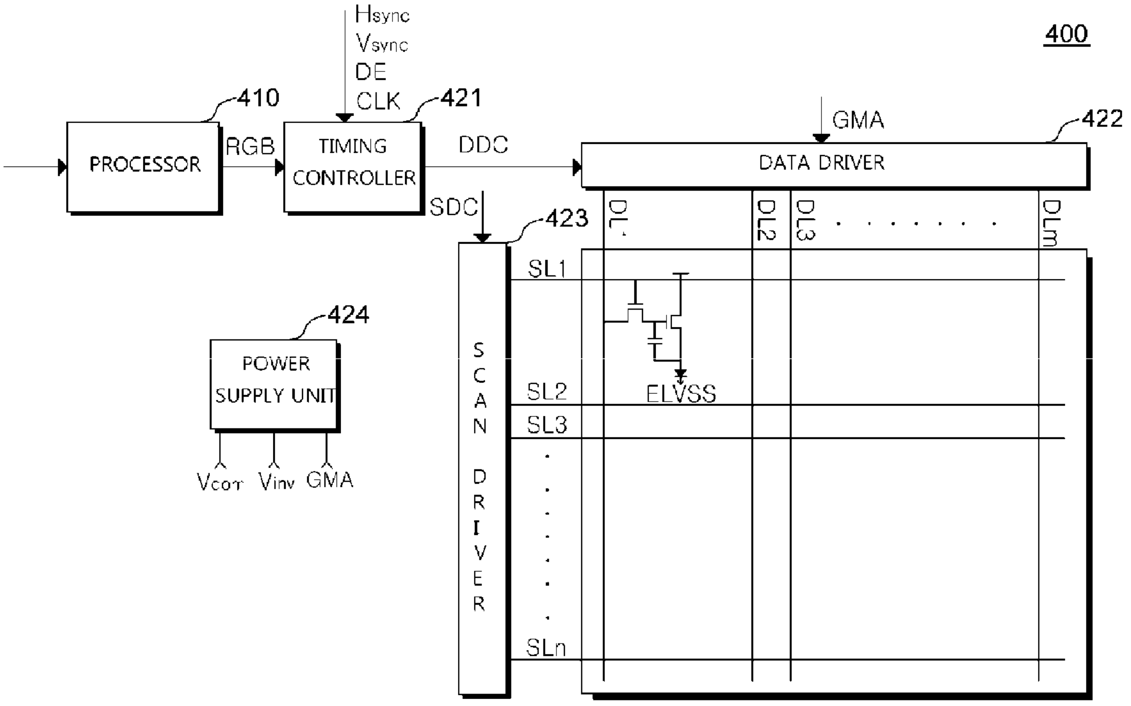
FIG. 4 is a block diagram illustrating an OLED device according to one exemplary embodiment of the present disclosure.

FIG. 4 is a block diagram illustrating an OLED device according to one exemplary embodiment of the present disclosure.

An OLED device 400 includes a processor 410, a timing controller 421, an organic light emitting display panel, a data driver 422, a scan driver 423 and a power supply unit 424.

For convenience, the descriptions of the processor 410, the timing controller 421, the data driver 422 and the scan driver 423 that are substantially the same as the processor 310, the timing controller 321, the data driver 322 and the scan driver 323 of LCD device in term of its functionality.

The power supply unit 424 supplies voltages to the data driver 422, the scan driver 423 and the organic light emitting display panel. The power supply unit 424 supplies gamma voltages GMA to an ELVDD, an ELVSS and the data driver 322.

The OLED device is a display device that causes a current to flow in an organic emitting layer, thereby enabling the organic emitting layer to emit light. The OLED device emits light of a specific wavelength using the organic emitting layer. The organic emitting layer at least includes a cathode, the organic emitting layer and an anode.

An OLED device 400 according to one exemplary embodiment of the present disclosure, the OLED device can be implemented into a top emission structure or a bottom emission structure. The top emission structure comprises a mirror structure under the anode to reflect the emitted light to upward direction. The bottom emission structure comprises a mirror structure as cathode to reflect the emitted light to downward direction.

The organic light emitting display panel includes a plurality of scan lines SL1 to SLn, a plurality of data lines DL1 to DLm, and a plurality of sub-pixels. In FIG. 4, for convenience of description, one sub-pixel is illustrated. The scan lines SL1 to SLn extend in one direction, and the data lines DL1 to DLm extend in a direction intersecting the one direction or in a direction parallel to the one direction. Each of the sub-pixels includes a switching thin film transistor connected to a corresponding scan line and a corresponding data line, and a driving thin film transistor connected an anode. An organic emitting layer and a cathode are stacked on the anode.

The switching thin film transistors and the driving thin film transistors are used for controlling the OLED pixels. When a scan signal is applied from the scan line SL1, a corresponding switching thin film transistor transfers a data signal applied from the data line DL1 to a gate electrode of a corresponding driving thin film transistor. The driving thin film transistor transfers a current transferred through a power line by the data signal transferred from the switching thin film transistor to a corresponding anode, and controls the light emission of the organic emitting layer of a corresponding pixel or sub-pixel with the current transferred to the anode.

Figure 5A:
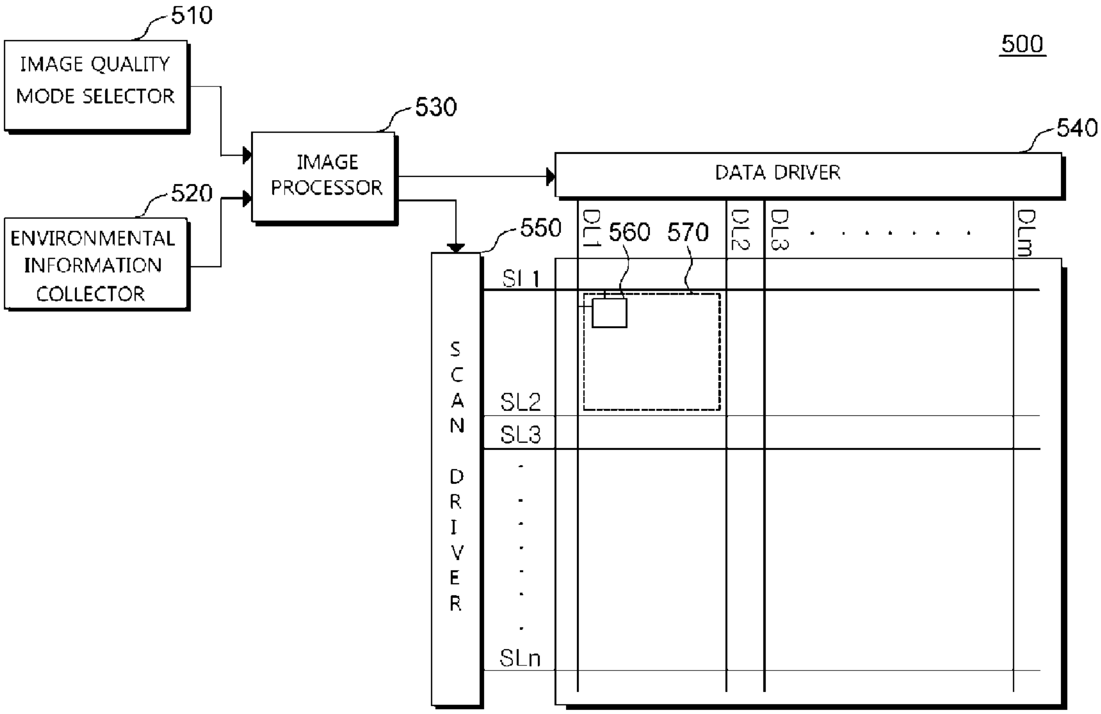
FIG. 5A is a block diagram illustrating an electronic device according to another embodiment of the present disclosure.

FIG. 5A is a block diagram illustrating an electronic device according to another embodiment of the present disclosure.

Referring to FIG. 5A, an electronic device including the display device includes an image quality mode selector 510, an environmental information collector 520, an image processor 530, a data driver 540, a scan driver 550, a plurality of thin film transistors 560, and a plurality of pixel areas.

Figure 5B:
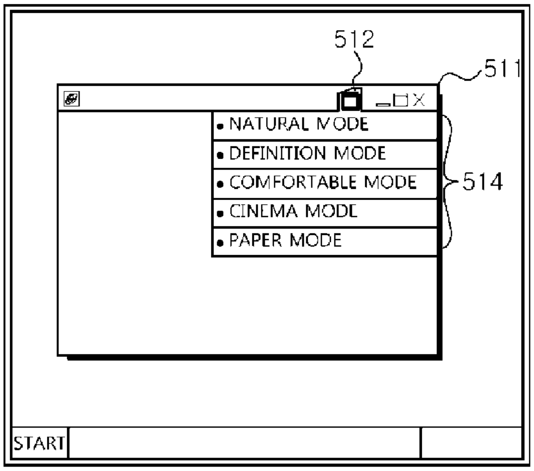
FIG. 5B is a schematic diagram for describing a user interface (UI) for selecting an image quality mode in the electronic device according to another embodiment of the present disclosure.
Figure 5B:
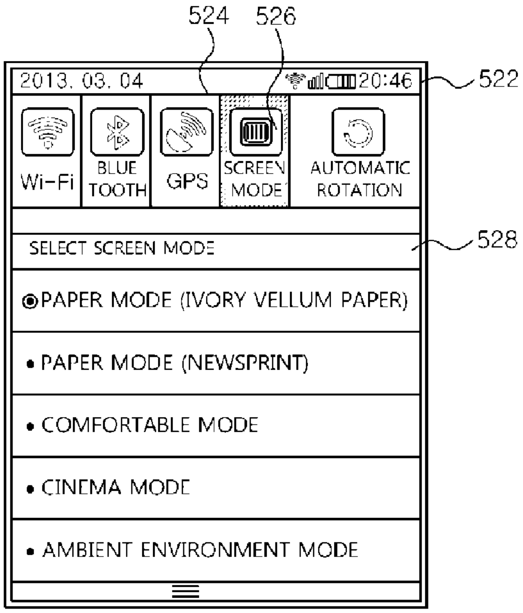
Figure 5B:
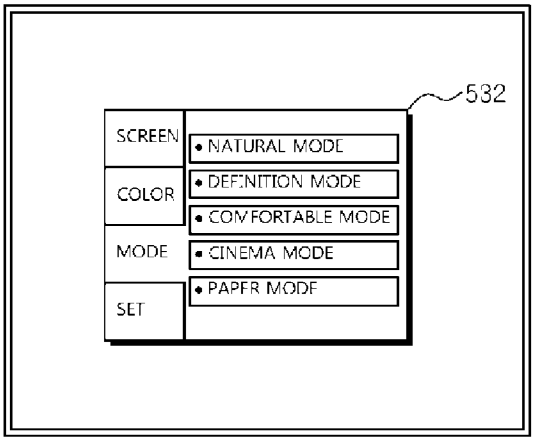

The image quality mode selector 510 is an element for selecting one or more image quality modes from among a plurality of image quality modes by a user. A storage means storing various image quality modes, and a means transferring a selected image quality mode. The image quality mode selector 510 for a user input may be implemented in an OS, or may be configured as a portion of a driving circuit unit of the display device so as to be implemented as an on-screen display (OSD) of the display device. FIG. 5B is a schematic diagram for describing a user interface (UI) for selecting an image quality mode in the electronic device according to another embodiment of the present disclosure.

A portion (a) of FIG. 5B illustrates a UI for selecting an image quality mode from a program window 511 displayed by the OS. A right upper end of the program window 511 displays a tab 512 for selecting an image quality mode. When the tab 512 is selected, a plurality of selectable image quality modes 514 is displayed.

The paper mode is a mode for imitating the optical characteristics of the image content printed on paper as described previously.

A list of image quality modes can be provided for user's preference, for example natural mode, definition mode, comfortable mode and cinema mode. When a selectable image quality mode is selected, the selected image quality mode is applied to the program window 511, which is displayed.

A portion (b) of FIG. 5B illustrates a UI for selecting an image quality mode under a mobile OS. In the portion (b) of FIG. 5B, a state display window 522, a menu selection window 524, and an image quality mode selection window 528 are displayed. The menu selection window 524 and image quality mode selection window 528 may be state bars which are displayed by performing a touch from an upper end edge to a lower end edge of a touch screen included in a mobile device. The UI may be designed such that when an image quality mode tab 526 is selected by scrolling a corresponding state bar, an image quality mode is selected under the mobile OS. The selectable image quality modes may include various paper modes. A paper mode can provide a different paper types, for example, ivory vellum paper, newsprint paper and copying paper in which, the optical characteristics including surface reflectance by wavelength, surface texture, transmittance characteristics are stored.

A portion (c) of FIG. 5C illustrates a UI for selecting an image quality mode in an OSD implemented by a display device. Various image quality modes may be selected in an OSD 532, the display device may collect a plurality of factors, and a processing unit of the display device may apply an image quality mode through the above-described methods. A description of a selectable image quality mode is omitted in order to avoid a description repetitive of the portion (a) of FIG. 5B.

Returning again to FIG. 5A, the environmental information collector 520 collects ambient environmental information. The ambient environmental information includes values collected from the color sensor, the color temperature sensor, the proximity sensor, the image sensor, the camera, the illumination sensor, the GPS module, the application information, the digital watch, etc. The color sensor, the color temperature sensor, the proximity sensor, the image sensor, the camera, the illumination sensor, the GPS module, and the application information have been described above, and thus, for convenience of description, a repetitive description is omitted.

The image processor 530 receives a selected image quality mode from the image quality mode selector 510, and receives collected environmental information from the environmental information collector 520. The image processor 530 image-processes an input image according to the selected image quality mode and the collected environmental information. The image processor 530 variably image-processes the image quality mode selected by the image quality mode selector 510 according to the environmental information. A method of processing an input image is the same as the image processing method described above with reference to FIGS. 1G to 1I, and thus a repetitive description is omitted.

The data driver 540 outputs input signals image-processed by the image processor 530 to the data lines of the display device. The scan driver 550 outputs the scan signal to the scan lines of the display device.

Each transistor is formed in an intersection area between a corresponding data line and a corresponding gate line, and is driven by the scan signal from the scan driver 550. A pixel unit 570 displays an image corresponding to data signals from the data driver 540 using a transistor unit.

An electronic device 500 according to another embodiment of the present disclosure may be implemented in an OS enabling the simultaneous execution of a plurality of applications. The image quality mode selector 510 of the electronic device 500 may set an image quality mode for each of the plurality of applications. The environmental information collector 520 collects environmental information. That is, the image quality mode selector 510 may store information on the plurality of applications installed in the OS, and separately select an image quality mode for each of the plurality of applications installed in the OS. Environmental information obtained from the environmental information collector 520 may be separately selected according to each of the applications.

In the electronic device 500 according to another embodiment of the present disclosure, an input image corresponding to each of the plurality of applications is image-processed according to each image quality mode selected by the image quality mode selector 510 and information collected by the environmental information collector 520. The plurality of applications may be displayed in the same image quality mode or different image quality modes. Also, the plurality of image quality modes may have different environmental information associated with adjustment of the image quality mode. For example, a text mode of a text viewer may define image analysis for weight on a text and a measurement value from the color temperature sensor as environmental information. The cinema mode of a video player may define an illumination value from the illumination sensor and current time information from the digital watch as environmental information.

The image processor 530 may obtain information on the plurality of applications from the OS, and determine an image processing area based on the information. The information on the plurality of applications may include coordinate information of the above-described application window, and an area of an applied image quality mode may be determined according to the coordinate information. Therefore, a user may select an image quality mode for each of the plurality of applications, and the selected image quality mode may be optimized based on environmental information or adjusted according to the user's preference.

Figure 6:
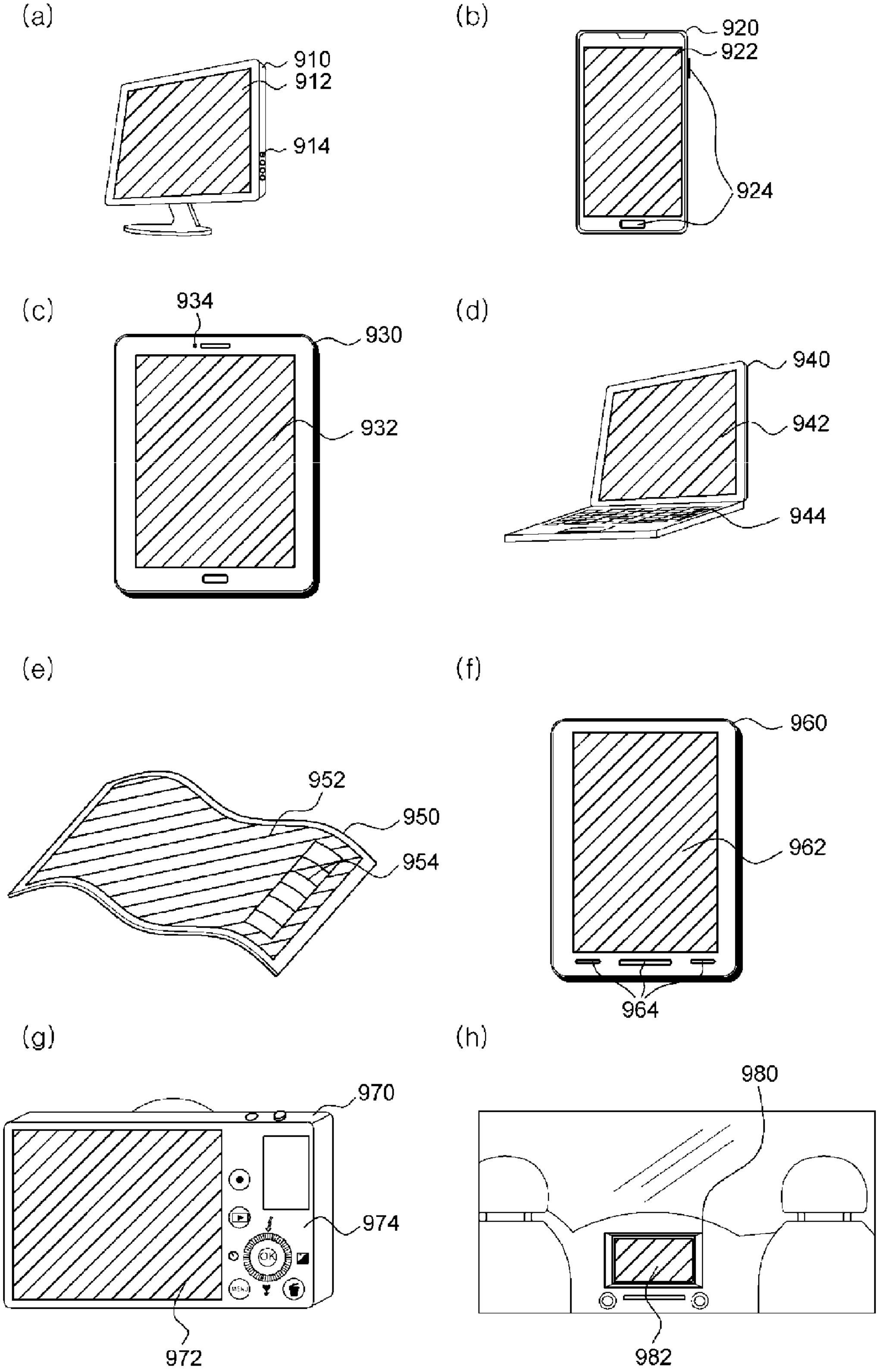
FIG. 6 is a schematic diagram illustrating a plurality of devices to which a display device according to one exemplary embodiment of the present disclosure can be applied.

FIG. 6 is schematic diagrams illustrating a plurality of devices to which a display device according to one exemplary embodiment of the present disclosure can be applied.

A portion (a) of FIG. 6 illustrates a case in which a display apparatus according to various embodiments of the present disclosure is used as a display device 910.

A portion (b) of FIG. 6 illustrates a case in which a display apparatus 922 according to various embodiments of the present disclosure is a mobile communication device 920.

A portion (c) of FIG. 6 illustrates a case in which a display apparatus 932 according to various embodiments of the present disclosure is used as a tablet PC 930.

A portion (d) of FIG. 6 illustrates a case in which a display apparatus 942 according to various embodiments of the present disclosure is used as a notebook computer 940.

A portion (e) of FIG. 6 illustrates a case in which a display apparatus 952 according to various embodiments of the present disclosure is used as a flexible display device 950.

A portion (f) of FIG. 6 illustrates a case in which a display apparatus 962 according to various embodiments of the present disclosure is used as an e-book device 960.

A portion (g) of FIG. 6 illustrates a case in which a display apparatus 972 according to various embodiments of the present disclosure is used as a digital camera 970.

A portion (h) of FIG. 6 illustrates a case in which a display apparatus 982 according to various embodiments of the present disclosure is used as a navigation device 980 for vehicles.

Figure 7:
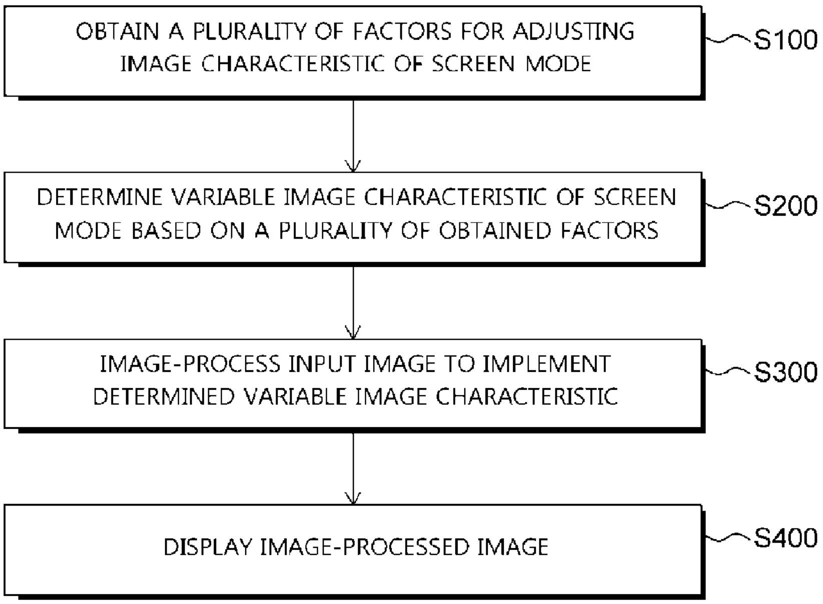
FIG. 7 is a flowchart illustrating a mode control method of a display device according to one exemplary embodiment of the present disclosure.

FIG. 7 is a flowchart illustrating a mode control method of a display device according to one exemplary embodiment of the present disclosure. For convenience of description, the mode control method will be described below with reference to a processing unit and display unit of the display device. Also, all stages may be performed separately, but in the following description, for convenience of description, all the stages will be described as one operation.

The processing unit of the display device obtains a plurality of factors associated with variable image characteristics of an image quality mode in operation S100. The plurality of factors may be obtained from at least one of a color sensor, a color temperature sensor, a proximity sensor, an image sensor, a camera, an illumination sensor, a GPS module, and an acceleration sensor. Alternatively, the plurality of factors may be obtained through analysis of an input image and application information.

The mode control method may further include an operation of determining whether the input image includes text based on the plurality of obtained factors. The variable image characteristics may include at least one of a color temperature, luminance, and a contrast ratio, and may further include definition, a color reproduction rate, etc.

The processing unit determines variable image characteristics of a paper mode based on the plurality of obtained factors in operation S200. Determining the variable image characteristics of the paper mode may be performed by substituting the plurality of obtained factors into a calculation equation. Alternatively, a look up table (LUT) may be used. The variable image characteristics denote image characteristics variably adjusted by a plurality of factors.

The processing unit image-processes the input image based on the determined variable image characteristics in operation S300. Image-processing the input image based on the variable image characteristics may denote image-processing a portion of an image according to a coordinate window of an application of the input image.

Also, the input image may include gradation data of R, G, and B, and processing the input image may include calculating the maximum gradation data and minimum gradation data of R, G, and B from the variable image characteristics, and converting gradation data of R, G, and B of the input image based on the calculated maximum gradation data and minimum gradation data.

Moreover, processing the input image may further include processing the image to enable more natural transition of the input image and the image-processed image.

The image-processed image is displayed by the display unit in operation S400. When the display unit is a liquid crystal display unit, brightness of backlight may be determined based on the variable image characteristics when the input image is processed, and the input image may be image-processed based on the brightness of the backlight and the variable image characteristics.

According to the embodiments of the present disclosure, there are provided an electronic device that may adjust a detailed image characteristics of an image quality mode to be suitable for variable ambient environmental factors or displayed content in a display device providing various image quality modes, thus providing a comfortable image quality mode suitable for an ambient environment including luminance, a contrast ratio, and a color temperature which correspond to ambient environmental factors.

In addition, according to the embodiments of the present disclosure, an electronic device can provide an image quality providing a user with a paper-like feeling based on a plurality of factors in the paper mode depending on an ambient environment, thus providing various user experiences.

In addition, according to the embodiments of the present disclosure, an electronic device can determine the paper mode condition optimal for a user based on a plurality of factors in the paper mode, and displays an image depending on the determined paper mode condition.

In addition, according to the embodiments of the present disclosure, an electronic device can provide a natural image quality comfortable to the eyes of a user using the look up table (LUT) or the arithmetic operation equation based on a plurality of factors including various pieces of ambient environmental information and content information in various image quality modes depending on an ambient environment, thus providing various user experiences.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship. Hereinafter, the present disclosure will be described in detail with reference to the accompanying drawings.

Operations of the methods or algorithm described in connection with the exemplary embodiments disclosed in this specification may be directly implemented using a hardware module, a software module, or a combination thereof executed by a processor. The software module may be permanently installed on a RAM memory, flash memory, ROM memory, EPROM memory, EEPROM memory, register, hard disk, detachable disk, CD-ROM, or any other types of storage media known in the related art. An exemplary storage medium may be coupled to a processor, so that the processor can read information from a storage medium and write information in a storage medium. For an alternative example, a storage medium may be formed integrally with a processor. In this case, the processor and the storage medium may be permanently mounted in an application-specific integrated circuit (ASIC). The ASIC may be permanently mounted in a user terminal. For an alternative example, the processor and the storage medium may be permanently mounted as separate components in a user terminal.

It will be apparent to those skilled in the art that various modifications can be made to the above-described exemplary embodiments of the present disclosure without departing from the spirit or scope of the invention. Thus, it is intended that the present disclosure covers all such modifications provided they come within the scope of the appended claims and their equivalents.

What is claimed is:

1. A method for simulating paper-like images on a display, comprising;

accessing image characteristics of paper and image characteristics of ink for imitating the optical characteristics of image content printed on paper according to an image quality mode;

measuring one or more ambient light characteristics from one or more sensors;

determining maximum brightness values for red, green and blue (RGB) sub-pixels of display pixels based on a light reflectance rate of the paper and the ambient light characteristics;

determining minimum brightness values for the RGB sub-pixels of the display pixels based on a light reflectance rate of the ink and the ambient light characteristics;

scaling red, green and blue (RGB) color values of an input image associated with the RGB sub-pixels of each of the display pixels in reference to the maximum brightness values and the minimum brightness values; and activating the display pixels using the scaled RGB color values of the input image to output the paper-like images on the display.

2. The method of claim 1, wherein the maximum brightness values and the minimum brightness values for the RGB sub-pixels are generated by:

converting the one or more ambient light characteristics into a normalized set of RGB color values of ambient light;

applying the light reflectance rate of the paper to each of the normalized RGB color values of the ambient light; and applying the light reflectance rate of the ink to each of the normalized RGB color values of the ambient light.

3. The method of claim 1, wherein scaling the color values of the input image is performed based on the following equation (7), equation (8) and equation (9):

$$R_{output} = R_{min} + \frac{R_{max} - R_{min}}{2^n - 1} \times R_{input} \quad \text{Eqn (7)}$$

$$G_{output} = G_{min} + \frac{G_{max} - G_{min}}{2^n - 1} \times G_{input} \quad \text{Eqn (8)}$$

-continued $$B_{output} = B_{min} + \frac{B_{max} - B_{min}}{2^n - 1} \times B_{input} \quad \text{Eqn (9)}$$

where the $R_{max}$, the $G_{max}$ and the $B_{max}$ are the maximum brightness values for the RGB sub-pixels of the display pixels, the $R_{min}$, the $G_{min}$ and the $B_{min}$ are the minimum brightness values for RGB sub-pixels of the display pixels, the $R_{input}$, the $G_{input}$ and the $B_{input}$ are the RGB color values of the input image associated with the corresponding RGB sub-pixels of each of the display pixels, and the $R_{output}$, the $G_{output}$ and the $B_{output}$ are the scaled RGB color values.

4. The method of claim 1, further comprising:

adjusting the red, the green and the blue color values of the input image associated with the RGB sub-pixels of each of the display pixels based on texture of the paper.

5. The method of claim 1, wherein the one or more ambient light characteristics includes an illumination value and a color temperature value of the ambient light, and wherein the illumination value and the color temperature value are estimated based on current time and current weather conditions at a current geographical position of the display.

6. The method of claim 1, wherein a target luminance in a paper mode has a minimum emission luminance.

7. The method of claim 1, wherein a contrast ratio of the converted input image is between 20:1 and 100:1.

8. The method of claim 1, wherein the maximum brightness values of the RGB sub-pixels are determined by multiplying the light reflectance rate of the paper and the measured ambient light characteristics, wherein the minimum brightness values of the RGB sub-pixels are determined by multiplying the light reflectance rate of the ink and the measured ambient light characteristics.

9. The method of claim 8, wherein, the light reflectance rate of the paper comprises a reflectance of visible wavelengths of the paper, wherein the measured ambient light characteristics comprise an ambient light intensity distribution of visible wavelength, wherein the light reflectance rate of the ink comprises a reflectance of visible wavelengths of the ink.

10. A display, comprising;

a plurality of display pixels, each of the pixels having red, green and blue (RGB) sub-pixels;

one or more sensors for measuring one or more ambient light characteristics; and a processor configured to:

access image characteristics of paper and image characteristics of ink for imitating the optical characteristics of image content printed on paper according to an image quality mode;

determine maximum brightness values for the RGB sub-pixels of the display pixels based on a light reflectance rate of the paper and the measured ambient light characteristics;

determine minimum brightness values for the RGB sub-pixels of the display pixels based on a light reflectance rate of the ink and the measured ambient light characteristics;

scale red, green and blue (RGB) color values associated with the respective RGB sub-pixels of each of the display pixels in reference to the maximum brightness values and the minimum brightness values; and activate the display pixels using the scaled RGB color to output the paper-like images on the display.

11. The display of claim 10, wherein the processor is configured to convert the one or more ambient light characteristics into a normalized set of RGB color values, and to apply the light reflectance rate of the paper to each of the normalized RGB color values of the ambient light to calculate the maximum brightness values, and to apply the light reflectance rate of the ink to each of the normalized RGB color values of the ambient light to calculate the minimum maximum brightness values for the RGB sub-pixels.

12. The display of claim 10, wherein the processor is configured to receive application information indicative of a type of display content, and to activate the display pixels using the scaled RGB color values when the type of display content is a text oriented content.

13. The display of claim 12, wherein the processor is configured to identify a size and a location of the display content when the type of display content is the text oriented content, and to activate the display pixels in a part of the display corresponding to the text oriented content with the scaled RGB color values.

14. The display of claim 10, wherein said one or more sensors are configured to measure intensity of RGB in the ambient light, and wherein the processor is configured to scale the RGB color values using a look up table (LUT) including a range of scaled RGB values corresponding to a range of the intensity of RGB in the ambient light.

15. The display of claim 14, wherein the processor is configured to convert the measured intensity of RGB in the ambient light by said one or more sensors to be applicable to the LUT.

16. The display of claim 10, wherein a reflectance by wavelength of black is a sum of reflectance by wavelength of cyan, magenta and yellow.

* * * * *